(12) United States Patent
Sinha et al.

(10) Patent No.: US 12,515,792 B2
(45) Date of Patent: *Jan. 6, 2026

(54) FIXED WING AIRCRAFT WITH TRAILING ROTORS AND T-TAIL

(71) Applicant: Kitty Hawk Corporation, Palo Alto, CA (US)

(72) Inventors: Pranay Sinha, Sunnyvale, CA (US); Damon Vander Lind, Alameda, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/062,829

(22) Filed: Feb. 25, 2025

(65) Prior Publication Data

US 2025/0340291 A1    Nov. 6, 2025

Related U.S. Application Data

(63) Continuation of application No. 18/211,510, filed on Jun. 19, 2023, now Pat. No. 12,263,942, which is a continuation of application No. 17/186,928, filed on Feb. 26, 2021, now Pat. No. 11,738,863, which is a continuation of application No. 16/530,782, filed on Aug. 2, 2019, now Pat. No. 10,981,648.

(51) Int. Cl.
| | |
|---|---|
| *B64C 29/00* | (2006.01) |
| *B64C 5/02* | (2006.01) |
| *B64C 11/46* | (2006.01) |
| *B64C 39/12* | (2006.01) |

(52) U.S. Cl.
CPC ............ *B64C 29/0033* (2013.01); *B64C 5/02* (2013.01); *B64C 11/46* (2013.01); *B64C 39/12* (2013.01)

(58) Field of Classification Search
CPC ....... B64C 5/02; B64C 11/46; B64C 29/0033; B64C 29/12
See application file for complete search history.

(56) References Cited

U.S. PATENT DOCUMENTS

| | | | | |
|---|---|---|---|---|
| 3,089,666 | A | * | 5/1963 | Quenzler ............ B64C 29/0033 244/66 |
| 3,856,238 | A | * | 12/1974 | Malvestuto, Jr. ......... B64B 1/00 244/6 |
| 4,746,081 | A | * | 5/1988 | Mazzoni ................. B64C 39/12 244/45 R |
| 9,694,906 | B1 | * | 7/2017 | Sadek ...................... B64C 25/10 |
| 2011/0168835 | A1 | * | 7/2011 | Oliver ..................... B64D 27/06 244/12.4 |
| 2015/0266571 | A1 | * | 9/2015 | Bevirt ................. B64C 29/0033 244/7 C |
| 2015/0344134 | A1 | * | 12/2015 | Cruz Ayoroa ...... B64C 29/0033 244/48 |

(Continued)

*Primary Examiner* — Tye William Abell
(74) *Attorney, Agent, or Firm* — Van Pelt, Yi & James LLP

(57) ABSTRACT

An aircraft that includes a canard having a leading edge and a trailing edge, a forward swept and fixed wing having a trailing edge, and a plurality of tilt rotor submodules, a dovetail, and a T-tail. The plurality of tilt rotor submodules are coupled to the trailing edge of the forward swept and fixed wing. The dovetail is attached to an underside of a fuselage. The T-tail is located above the dovetail. A horizontal plane of the T-tail is at a height that is higher than a horizonal plane of the forward swept and fixed wing.

20 Claims, 22 Drawing Sheets

(56) References Cited

U.S. PATENT DOCUMENTS

| | | | |
|---|---|---|---|
| 2017/0197700 A1* | 7/2017 | Wainfan | B64D 27/357 |
| 2018/0086447 A1* | 3/2018 | Winston | B64C 29/0033 |
| 2019/0127061 A1* | 5/2019 | McLaren | B64C 3/385 |
| 2019/0256194 A1* | 8/2019 | Vander Lind | B64C 39/12 |
| 2020/0164972 A1* | 5/2020 | Kiesewetter | B64C 27/20 |

* cited by examiner

FIXED WING AIRCRAFT WITH TRAILING ROTORS AND T-TAIL

CROSS REFERENCE TO OTHER APPLICATIONS

This application is a continuation of U.S. patent application Ser. No. 18/211,510 entitled FIXED WING AIRCRAFT WITH TRAILING ROTORS AND T-TAIL filed Jun. 19, 2023, which is a continuation of U.S. patent application Ser. No. 17/186,928, now U.S. Pat. No. 11,738,863, entitled FIXED WING AIRCRAFT WITH TRAILING ROTORS AND T-TAIL filed Feb. 26, 2021, which is a continuation of U.S. patent application Ser. No. 16/530,782, U.S. Pat. No. 10,981,648, entitled FIXED WING AIRCRAFT WITH TRAILING ROTORS AND T-TAIL filed Aug. 2, 2019, each of which is incorporated herein by reference for all purposes.

BACKGROUND OF THE INVENTION

New types of aircraft which can take off and land with smaller footprints are being developed. For example, these aircraft may be used in areas where there is no airport or runway. Some such aircraft designs have tilt rotors which are attached to the trailing edge of a forward swept and fixed (main) wing. New features and/or new configurations of the aircraft which can further improve upon the performance of the aircraft would be desirable. For example, if some or all of the horizontal lift surfaces of the aircraft were to stall out, improved stability and/or control would be desirable.

BRIEF DESCRIPTION OF THE DRAWINGS

Various embodiments of the invention are disclosed in the following detailed description and the accompanying drawings.

FIG. 2B is a diagram illustrating a bottom view of an embodiment of boundary layer thicknesses with motors on.

DETAILED DESCRIPTION

Figure 1:
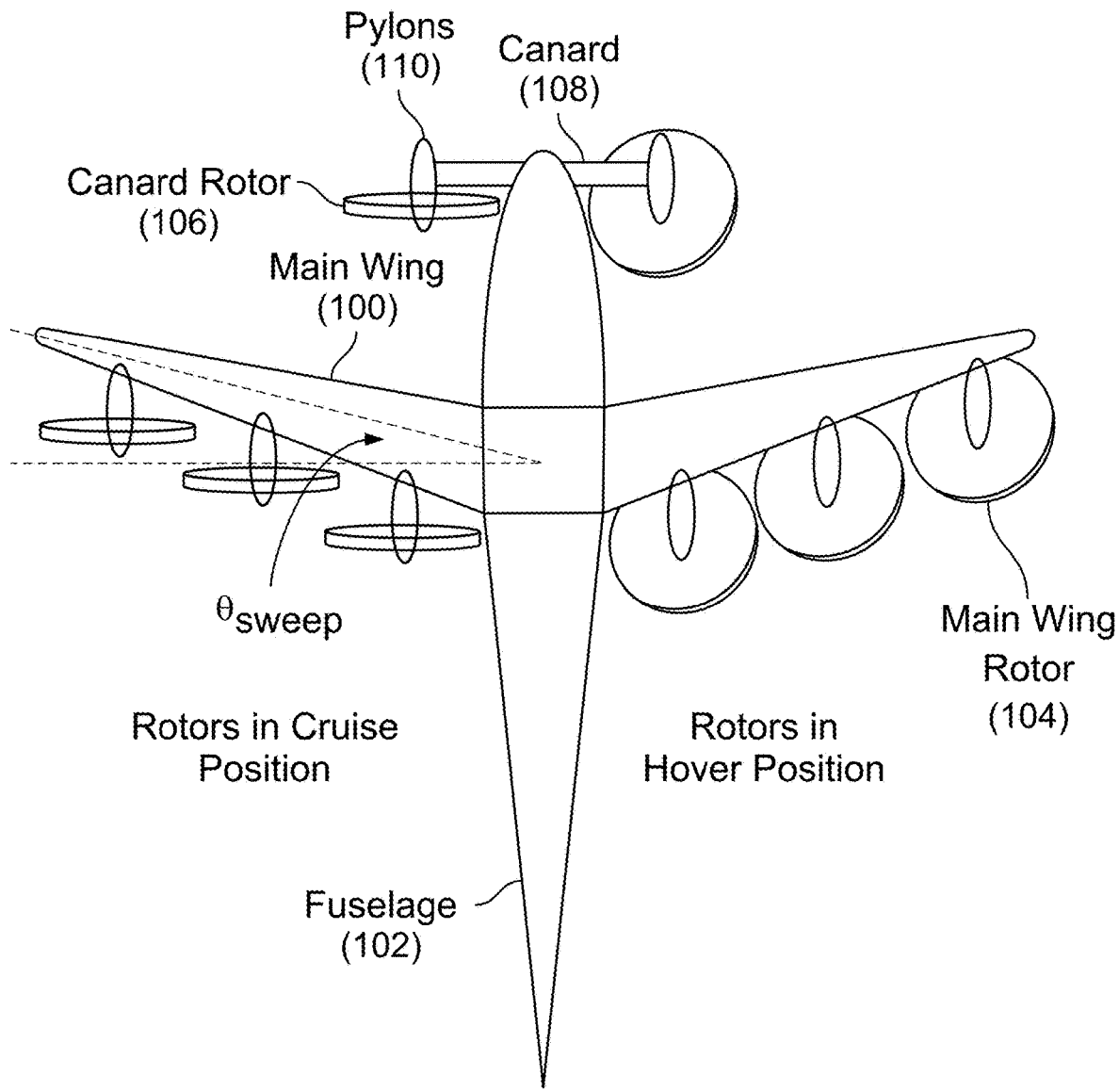
FIG. 1 is a diagram illustrating a top view of a forward swept, fixed wing multicopter embodiment with tilt rotors.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiment of an improved tilt rotor vehicle are described herein. In some embodiments, the aircraft includes a canard having a trailing edge, a forward swept and fixed wing having a horizontal plane and a trailing edge, and a plurality of tilt rotors where at least one of the plurality of tilt rotors is attached to the trailing edge of the canard and at least one of the plurality of tilt rotors is attached to the trailing edge of the forward swept and fixed wing. The aircraft also includes a T-tail having a horizontal plane, where the horizontal plane of the T-tail is at a height that is higher than the horizontal plane of the forward swept and fixed wing. As will be described in more detail below, this configuration helps to maintain control to a better degree as some or all of the horizontal lift surfaces stall out and/or helps to increase stability in a normal or regular high-speed flight envelope. First, it may be helpful to describe some earlier versions of the tilt rotor vehicle. The following figures describe some such earlier versions.

FIG. 1 is a diagram illustrating a top view of a forward swept, fixed wing multicopter embodiment with tilt rotors. In the example shown, the main wing (100) is a fixed wing which is attached to the fuselage (102) in a fixed manner or position. The main wing is not, in other words, a tilt wing which is capable of rotating. The main wing (100) is also forward swept (e.g., relative to the pitch axis). For example, the forward-sweep angle may be on the order of $\theta_{sweep}$ between 14° and 16° for aircraft embodiments with a canard (as shown here) or as high as 35° for aircraft embodiments without a canard.

In this example, the main wing (100) has six rotors (104) which are attached to the trailing edge of the main wing. For clarity, these rotors are sometimes referred to as the main wing rotors (e.g., to differentiate them from the rotors which are attached to the canard). Naturally, the number of rotors shown here is merely exemplary and is not intended to be limiting.

In addition to the six main wing rotors, there are two rotors (106) which are attached to the canard (108). These rotors are sometimes referred to as the canard rotors. The canard is thinner than the main wing, so unlike the main wing rotors, the canard rotors are attached to the distal ends of the canard as opposed to the trailing edge of the canard.

All of the rotors in this example are tilt rotors, meaning that they are capable of tilting or otherwise rotating between two positions. In this example, the rotors on the left-hand (i.e., port) side of the aircraft are in a cruise (e.g., forward flight, backward facing, etc.) position. See, for example, the position of canard rotor 106. In this position, the rotors are rotating about the (e.g., substantially) longitudinal axes of rotation so that they provide (substantially) backward thrust. When the rotors are in this position, the lift to keep the multicopter airborne comes from the airflow over the main wing (100) and the canard (108). In various embodiments, the rotational range of a tilt rotor may be as low as 5 degrees or as high as 95 degrees and is design and/or implementation specific.

The rotors on the right-hand (i.e., starboard) side of the aircraft are in a hover (e.g., vertical takeoff and landing, downward facing, etc.) position. See, for example, the position of main wing rotor 104. In this second position, the rotors are rotating about (e.g., substantially) vertical axes of rotation so that they provide (substantially) downward thrust. In this configuration, the lift to keep the multicopter airborne comes from the downward airflow of the rotors.

Generally speaking, the tilt rotors, when oriented to output thrust substantially downward, permit the aircraft to perform vertical takeoff and landings (VTOL). This mode or configuration (e.g., with respect to the manner in which the aircraft as a whole is flown and/or with respect to the position of the tilt rotors specifically) is sometimes referred to as hovering. The ability to perform vertical takeoffs and landings permits the aircraft to take off and land in areas where there are no airports and/or runways. Once airborne, the tilt rotors (if desired) change position to output thrust (substantially) backwards instead of downwards. This permits the aircraft to fly in a manner that is more efficient for forward flight; this mode or configuration is sometimes referred to as cruising.

A canard is useful because it can stall first (e.g., before the main wing), creating a lot of pitching moments and not much loss of lift at stall whereas a main wing stall loses a lot of lift per change in pitching moment (e.g., causing the entire aircraft to drop or fall). Stalls are thus potentially more benign with a canard compared to without a canard. The canard stall behavior is particularly beneficial in combination with a swept forward wing, as the stall of the main wing can create an adverse pitching moment if at the wing root and can create large and dangerous rolling moments if at the wing tip. Furthermore, a canard can create lift at low airspeeds and increase $CL_{max}$ (i.e., maximum lift coefficient) and provides a strut to hold or otherwise attach the canard motors to.

In some embodiments, the pylons (110) which are used to attach the rotors to the canard and/or main wing include some hinge and/or rotating mechanism so that the tilt rotors can rotate between the two positions shown. Any appropriate hinge mechanism may be used. For example, with ultralight aircraft, there are very stringent weight requirements and so a lightweight solution may be desirable. Alternatively, a fixed-tilt solution may also be used to meet very stringent weight requirements (as will be described in more detail below).

In some embodiments, the aircraft is designed so that the main wing (100) and canard (108) are able to provide sufficient lift to perform a glider-like landing if needed during an emergency. For example, some ultralight standards or specifications require the ability to land safely if one or more rotors fail and the ability to perform a glider-like landing would satisfy that requirement. One benefit to using a fixed wing for the main wing (e.g., as opposed to a tilt wing) is that there is no danger of the wing being stuck in the wrong position (e.g., a hover position) where a glider-like landing is not possible because of the wing position which is unsuitable for a glider-like landing.

Another benefit to a fixed wing with trailing edge mounted tilt rotors is stall behavior (or lack thereof) during a transition from hover position to cruise position or vice versa. With a tilt wing, during transition, the tilt wing's angle of attack changes which makes stalling an increased risk. A fixed wing with trailing edge mounted tilt rotors does not change the wing angle of attack (e.g., even if rotors are turned off/on or the tilt rotors are shifted). Also, this configuration both adds dynamic pressure and circulation over the main wing, which substantially improves the behavior during a transition (e.g., from hover position to cruise position or vice versa). In other words, the transition can be performed faster and/or more efficiently with a fixed wing with trailing edge mounted tilt rotors compared to a tilt wing (as an example).

Another benefit associated with tilt rotors (e.g., as opposed to a tilt wing) is that a smaller mass fraction is used for the tilt actuator(s). That is, multiple actuators for multiple tilt rotors (still) comprise a smaller mass fraction than a single, heavy actuator for a tilt wing. There are also fewer points of failure with tilt rotors since there are multiple actuators as opposed to a single (and heavy) actuator for the tilt wing. Another benefit is that a fixed wing makes the transition (e.g., between a cruising mode or position and a hovering mode or position) more stable and/or faster compared to a tilt wing design.

In some embodiments (not shown here), the rotors are variable pitch propellers which have different blade pitches when the rotors are in the hovering position versus the cruising position. For example, different (ranges of) blade pitches may enable more efficient operation or flight when in the cruise position (see, e.g., rotor 106) versus the hovering position (see, e.g., rotor 104). When the rotors are in a cruise position (see, e.g., rotor 106), putting the blade pitches into "cruising pitch" (e.g., on the order of) 26° enables low frontal area which is good for cruising (e.g., lower drag). When the rotors are in a hovering position (see, e.g., rotor 104), putting the blade pitches into a "hovering pitch" (e.g., on the order of) 6° enables high disc area which is good for hovering. To put it another way, one blade pitch may be well suited for cruising mode but not for hovering mode and vice versa. The use of variable pitch propellers enables better (e.g., overall) efficiency, resulting in less power consumption and/or increased flight range.

The following figures illustrate various benefits associated with the exemplary aircraft shown in FIG. 1.

Figure 2B:
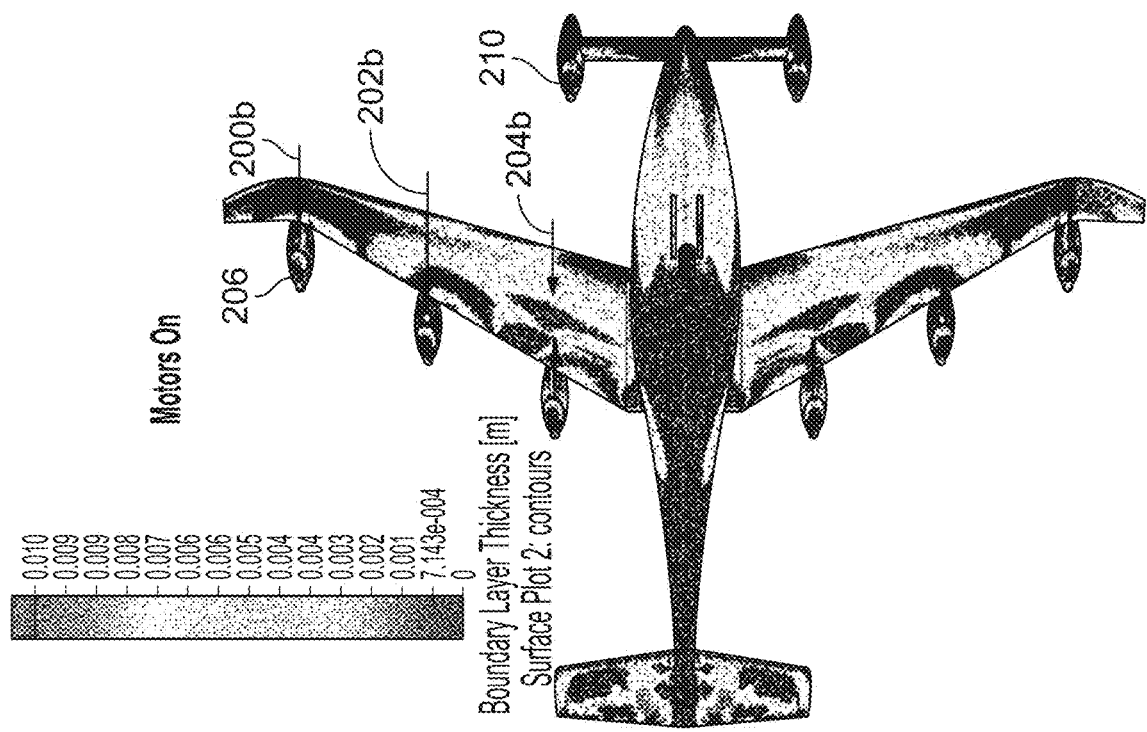
Figure 2A:
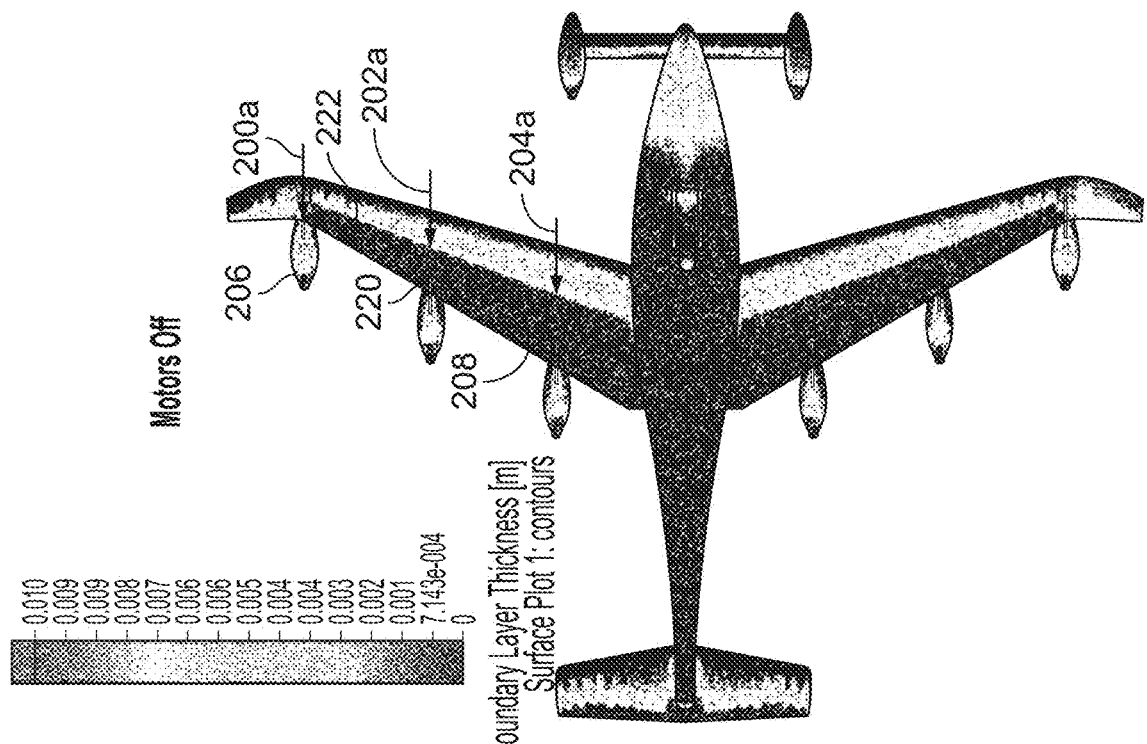
FIG. 2A is a diagram illustrating a bottom view of an embodiment of boundary layer thicknesses with the motors off.

FIG. 2A is a diagram illustrating a bottom view of an embodiment of boundary layer thicknesses with the motors off. In this example, laminar run lines 200a, 202a, and 204a illustrate laminar runs at various regions of the main wing. In this example, it is assumed that the aircraft is cruising (e.g., flying in a substantially forward direction). As in FIG. 1, the main wing rotors (206) are attached to the trailing edge of the main wing (208) in this embodiment. The next figure shows the boundary layer thicknesses with the rotors turned on.

FIG. 2B is a diagram illustrating a bottom view of an embodiment of boundary layer thicknesses with motors on. In this example, the motors are on and the rotors have an exit airflow velocity of 30 m/s. With the motors on, a low pressure region is created towards the aft of the wing which increases the laminar run on the main wing. See, for example, laminar run lines 200b, 202b, and 204b which correspond to laminar run lines 200a, 202a, and 204a from FIG. 2A. A comparison of the two sets illustrates that the laminar runs have increased for the first two locations (i.e., at 200a/200b and 202a/202b). The last location (i.e., 204a/204b) has only a slightly longer laminar run length due to interference from the canard rotors (210).

The drag from the main wing rotors (more specifically, the drag from the pylons which are used to attach the main wing rotors to the main wing) is hidden in the wake of the airflow coming off the main wing. See, for example FIG. 2A which more clearly shows that the pylons (220) are connected or otherwise attached behind most of the extent of laminar run (222). With the embodiment shown here, the pylons also get to keep some of the boundary layer thickness from the main wing, which means the pylons have lower drag per surface area. This improves the drag compared to some other alternate designs or configurations. The following figures describe this in more detail.

Figure 3A:
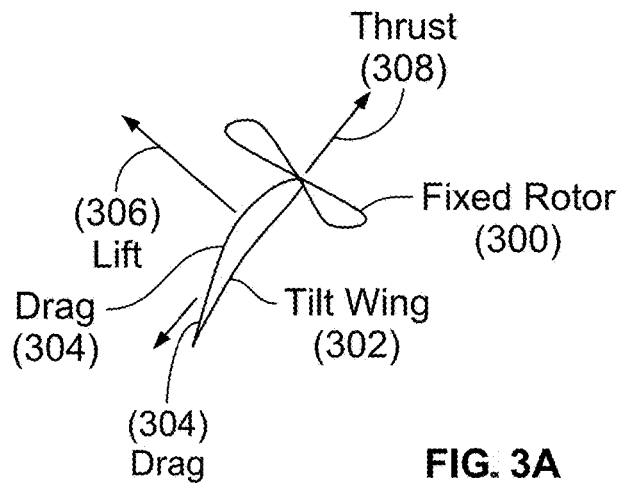
FIG. 3A is a diagram illustrating an example of a tilt wing configuration with corresponding lift vector, thrust vector, and drag.

FIG. 3A is a diagram illustrating an example of a tilt wing configuration with corresponding lift vector, thrust vector, and drag. In this example, a fixed rotor (300) is attached to a tilt wing (302) at a fixed position or angle. This is one alternate arrangement to the aircraft embodiment(s) described above. To direct the airflow produced by the fixed rotor (300) either backwards or downwards, the tilt wing (302) is rotated. As shown here, with this configuration, there is drag (304) at the trailing edge of the tilt wing, which is undesirable.

The lift (306) and thrust (308) for this configuration are also shown here, where the tilt wing is shown in the middle of a transition (e.g., between a cruising position and a hovering position). As shown here, the lift (306) and thrust (308) are substantially orthogonal to each other, which is inefficient. In other words, a tilt wing is inefficient during its transition.

Figure 3B:
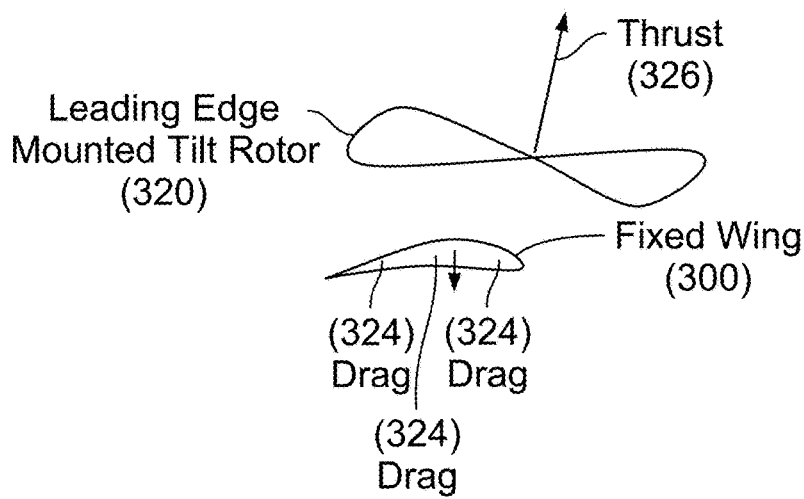
FIG. 3B is a diagram illustrating an example of a fixed wing configuration with a leading edge mounted tilt rotor and corresponding lift vector, thrust vector, and drag.

FIG. 3B is a diagram illustrating an example of a fixed wing configuration with a leading edge mounted tilt rotor and corresponding lift vector, thrust vector, and drag. In this example, a tilt rotor (320) is attached to the leading edge of a fixed wing (322). This is another alternate arrangement to the aircraft embodiment(s) described above. The corresponding drag (324) and thrust (326) for this arrangement are also shown. There is no useful lift produced with this configuration and therefore no lift vector is shown here.

Figure 3C:
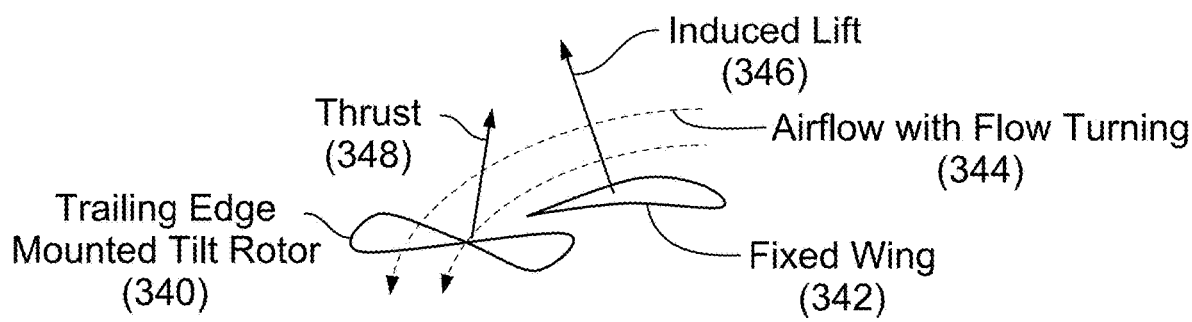
FIG. 3C is a diagram illustrating an embodiment of a fixed wing configuration with a trailing edge mounted tilt rotor and corresponding lift vector, thrust vector, and drag.

FIG. 3C is a diagram illustrating an embodiment of a fixed wing configuration with a trailing edge mounted tilt rotor and corresponding lift vector, thrust vector, and drag. In this example, the tilt rotor (340) is attached to the trailing edge of the fixed wing (342). In this configuration, the drag due to the trailing edge mounted tilt rotor (e.g., mostly due to its pylon, not shown) is hidden in the wake of the airflow coming off the main wing. As such, there is no drag (at least due to the tilt rotor (340)).

The position of the trailing edge mounted tilt rotor (340) relative to the fixed wing (342) also sucks air (344) over the fixed wing, after which the air turns or bends through the rotor and downwards. This flow turning over the wing generates a relatively large induced lift (346) which is shown here. The thrust vector (348) due to the rotors is also shown here. It is noted that the induced lift (346) and thrust (348) are substantially in the same direction (i.e., both are pointing substantially upwards) which is a more efficient arrangement, including during a transition. In other words, using a fixed wing with trailing edge mounted tilt rotors produces less drag and improved efficiency during a transition (e.g., due to the lift and thrust vectors which now point in substantially the same direction) compared to other rotor and wing arrangements. Note for example, drag 304 and drag 324 in FIG. 3A and FIG. 3B, respectively, and the orthogonal positions of lift 306 and thrust 308 in FIG. 3A.

The following figure illustrates an embodiment of flow turning in more detail.

Figure 4:
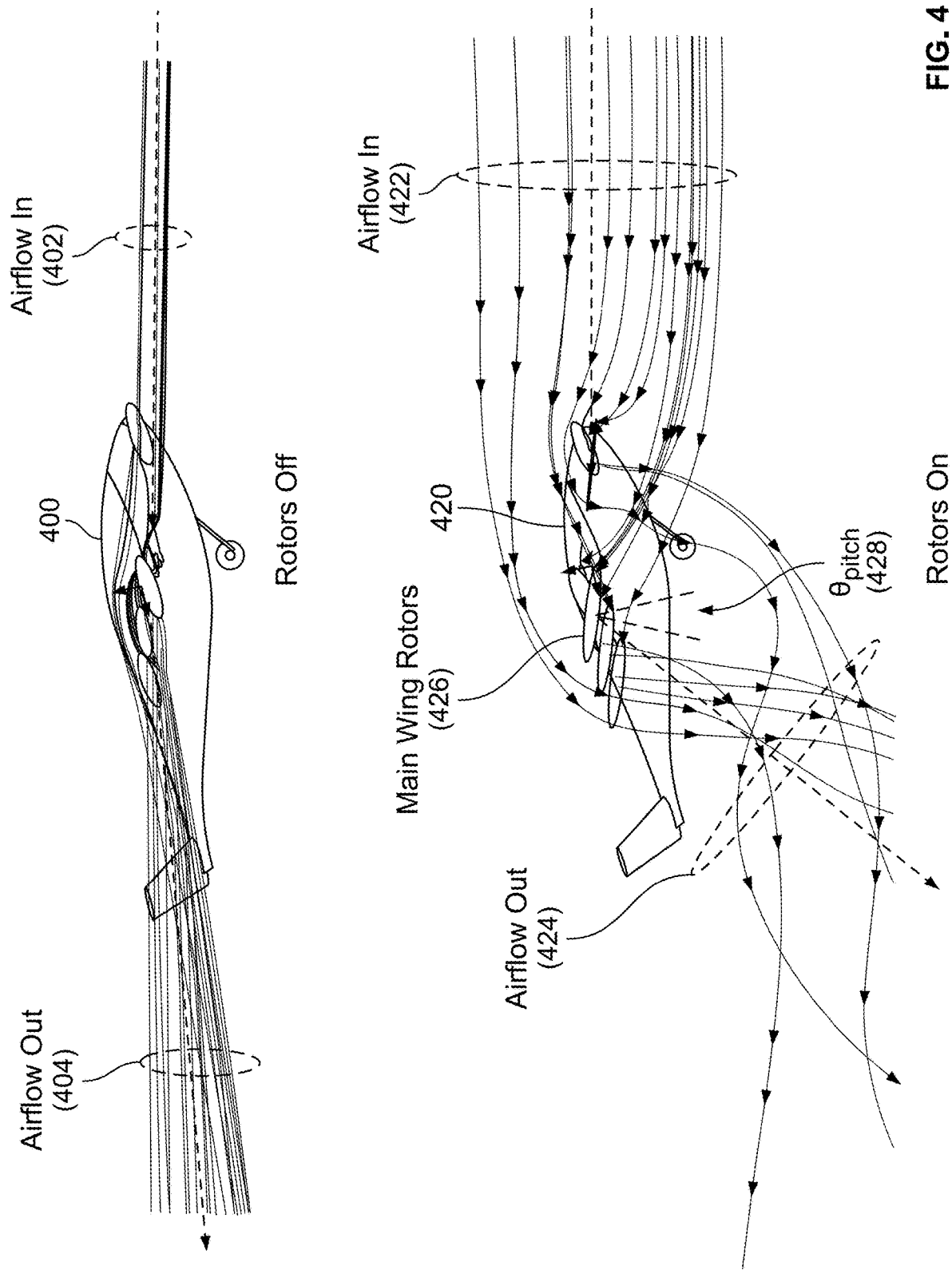
FIG. 4 is a diagram illustrating an embodiment of airflow produced when trailing edge mounted tilt rotors on a main wing are off.

FIG. 4 is a diagram illustrating an embodiment of airflow produced when trailing edge mounted tilt rotors on a main wing are off. In this example, a tilt rotor multicopter (400) is shown but with the main wing rotors turned off for comparison purposes. With the rotors off, the airflow in (402) and the airflow out (404) are moving in substantially the same direction. That is, the airflow does not turn (e.g., downwards) as it passes through the rotors.

Multicopter 420 shows the same multicopter as multicopter 400 except the rotors are turned on. In this example, the airflow in (422) and the airflow out (424) have noticeable different directions and there is noticeable turning or bending of the airflow as it passes through the rotors of the exemplary multicopter shown. As described above, this induces a noticeable lift, which is desirable because less power is consumed and/or the range of the multicopter increases.

In this example, the main wing rotors (426) are in the hovering position. As shown here, these rotors are slightly pitched or otherwise angled (e.g., with the tops of the main wing rotors pointing slightly forward and the bottoms pointing slightly backward). In this diagram, the amount of tilting is shown as $\theta_{pitch}$ (428) and in some embodiments is on the order of 90° of rotational range or movement (e.g., ~3° up from horizontal when in a cruise position (e.g., for minimum drag) and ~93° degrees down from horizontal when in a hover position which produces a rotational range of) ~96°. Although this angling or pitching of the rotors is not absolutely necessary for flow turning to occur, in some embodiments the main wing rotors are angled or otherwise pitched to some degree in order to increase or otherwise optimize the amount of flow turning. In some embodiments, the canard rotors are similarly pitched. It is noted that multicopter 420 is shown in a nose up position and therefore the vertical axis (e.g., relative to the multicopter) is not perpendicular to the ground and/or frame of reference.

In some embodiments, the rotors (e.g., the main wing rotors and/or canard rotors) are rolled or otherwise angled slightly outward, away from the fuselage, when the rotors are in hovering position. In some embodiments, this roll (e.g., outward) is on the order of 10° for greater yaw authority.

In some embodiments, the main wing is tapered (e.g., the wing narrows going outward towards the tip) in addition to being forward swept. The following figures describe various wing and/or tail embodiments.

Figure 5A:
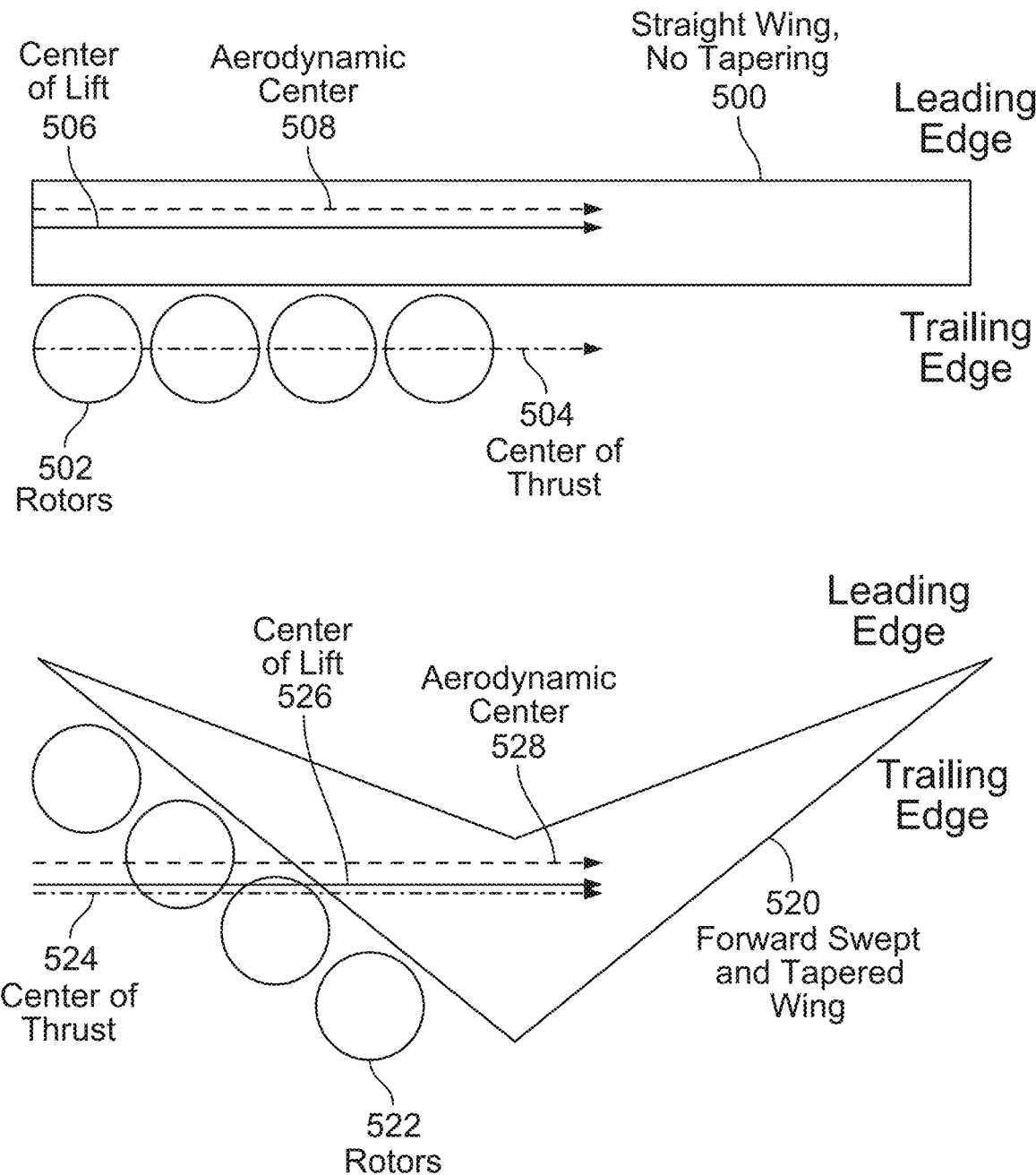
FIG. 5A is a diagram illustrating an embodiment of a forward swept and tapered wing and a straight wing for comparison.

FIG. 5A is a diagram illustrating an embodiment of a forward swept and tapered wing and a straight wing for comparison. In the example shown, wing 500 is a straight wing with no tapering (e.g., the wing is the same width from the center to the tip of the wing). Exemplary rotors (502) are shown at the trailing edge of the straight wing (500).

The center of thrust (504), indicated by a dashed and dotted line, is dictated by the placement or arrangement of the rotors and runs through the centers of the main wing rotors (502). For simplicity, the canard rotors are ignored in this example. The center of lift is based on the shape of the wing. For a rectangular wing such as wing 500, the center of lift (506), indicated by a solid line, runs down the center of the wing. Calculation of the aerodynamic center is more complicated (e.g., the aerodynamic center depends upon the cross section of the wing, etc.) and aerodynamic center 508, indicated by a dashed line, is exemplary and/or typical for this type of wing.

As shown here, the straight wing (500) and its corresponding arrangement of main wing rotors (502) produce a center of thrust (504) which is relatively far from both the center of lift (506) as well as the aerodynamic center. This separation is undesirable. More specifically, when the main wing rotors (502) are in hover position, if the center of thrust (504) is far from the center of lift (506), then the transition (e.g., in the context of the movement of the aircraft as a whole, such as switching from flying substantially upwards to substantially forwards or vice versa) would create very large moments and could overturn the vehicle or prevent acceleration or stability and/or require a massive and/or non-optimal propulsion system. In cruise, if the center of thrust (504) is far from the center of lift (506), it is not as important (e.g., since the thrust moments are both smaller and more easily balanced by aerodynamic moments), but it is still undesirable.

In contrast, the forward swept and tapered wing (520) and its corresponding arrangement of rotors (522) along the trailing edge produce a center of thrust (524), center of lift (526), and aerodynamic center (528) which are closer to each other. For example, the forward sweep of the wing brings the rotors forward to varying degrees. This causes the center of thrust to move forward (e.g., towards the leading edge and towards the other centers). The tapering of the wings prevents the aerodynamic center and center of lift from creeping forward too much (and more importantly, away from the center of thrust) as a result of the forward sweep. For example, with a forward swept wing with no tapering (not shown), the center of thrust would move forward approximately the same amount as the aerodynamic center and center of lift and would result in more separation between the three centers than is shown here with wing 520.

Some other benefits to a forward swept and tapered wing include better pilot visibility, and a better fuselage junction location with the main wing (e.g., so that the main wing spar can pass behind the pilot seat, not through the pilot). Furthermore, the taper reduces wing moments and puts the center of the thrust of the motors closer to the wing attachment to the fuselage, as referenced about the direction of flight, so there are less moments carried from wing to fuselage, a shorter tail boom (e.g., which reduces the weight of the aircraft), and improved pitch stability.

Figure 5B:
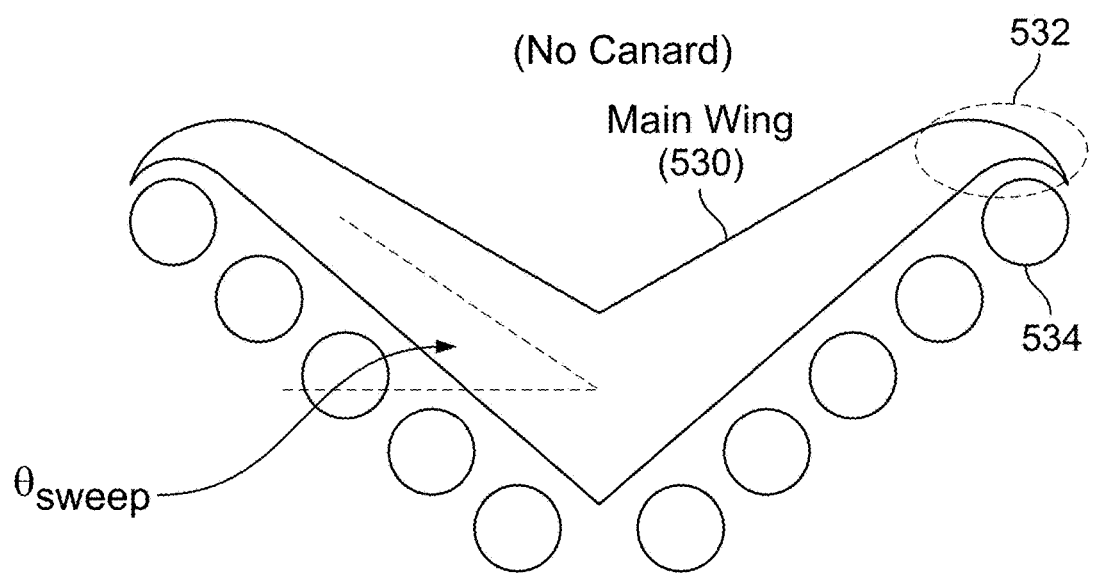
FIG. 5B is a diagram illustrating an embodiment of a wing configuration with a forward swept, tapered main wing and no canard.

FIG. 5B is a diagram illustrating an embodiment of a wing configuration with a forward swept, tapered main wing and no canard. In this example, the main wing (530) is forward swept and tapers (e.g., from the center of the wing to the tip). The tips (532) are rounded where the trailing edge follows the shape or contour of the outermost rotor (534) when that rotor is in a hover position as shown here. This may be attractive from a safety point of view because having the main wing wrap around the front of the rotor (e.g., with a relatively small gap between the blades of the rotor and the trailing edge of the main wing) enables the main wing to act as a shield for at least the front side of the outermost rotor (534). In this example, there are 10 main wing rotors (e.g., including rotor 534) which are attached to the trailing edge of the main wing (530).

In this wing configuration there is no canard. To compensate for the lack of a canard and/or canard rotors, the main wing has more forward sweep than if there was a canard and/or canard rotors. For example, the $\theta_{sweep}$ of the leading edge or spar shown here may be on the order of 20° or 30° as opposed to on the order of 10°-15° when there is a canard and/or canard rotors.

This type of wing configuration is attractive in applications where sensor placement or other volumetric or structural requirements make it infeasible to attach a canard to the fuselage forebody area. It also has the fringe benefit of providing additional protection to the pilot compartment in case of a blade-out (e.g., a blade shatters and/or becomes a projectile) even on one of the propellers, since the main wing blocks a substantial portion of the blade's trajectory cone intersecting the cockpit. It also may be beneficial in terms of simplicity and a reduction in the number of components on the system, and can be useful with a different number of rotors on the vehicle, where for packaging reasons a canard is not sensible.

Figure 5C:
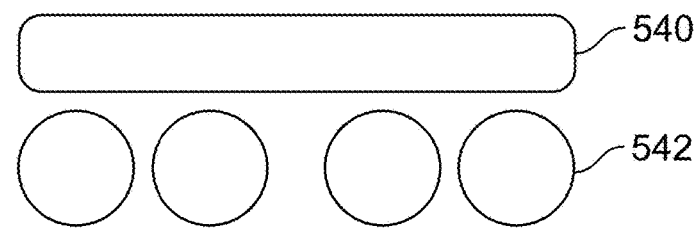
FIG. 5C is a diagram illustrating an embodiment of a wing configuration with a canard and a straight main wing.
Figure 5C:
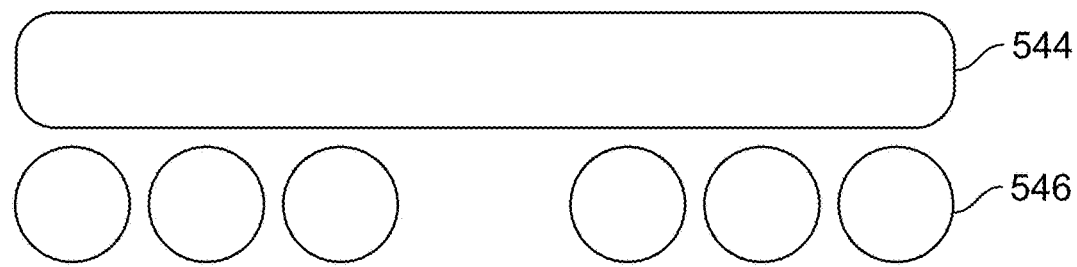

FIG. 5C is a diagram illustrating an embodiment of a wing configuration with a canard and a straight main wing. In this example, there is a canard (540) with four canard rotors (542) attached to the trailing edge of the canard. There is also a main wing (544) which is straight with six main wing rotors (546) attached to the trailing edge of the main wing. The center of lift, center of thrust, and aerodynamic center (now shown) may be relatively close to each other with the center of lift and center of thrust in front of the aerodynamic center, all of which are desirable properties or characteristics.

This type of wing configuration is attractive in applications where wing sweep is unfavorable structurally or from a controls standpoint, or where a compact vehicle footprint is required while increasing the available lift, and where induced drag is not important. The additional canard area helps with additional lift availability in forward flight and transition while additional rotors help with an increase in lift during hover. Adding additional rotors to the canard instead of the main wing allows the center of thrust to move forward, matching the forward motion of the aerodynamic center due to increase in canard area, provided the canard has a small area. Increasing canard area allows vehicle span to remain unchanged or smaller compared to increasing lifting surface area by scaling up a large main wing.

Figure 5D:
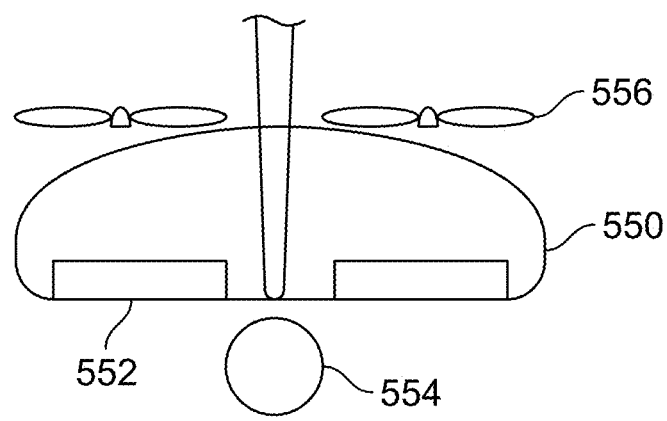
FIG. 5D is a diagram illustrating an embodiment of a tail.

FIG. 5D is a diagram illustrating an embodiment of a tail. In some embodiments, an aircraft includes a tail (i.e., a tail is not necessary) and this diagram shows one example of a tail. In this example, the tail (550) has two control surfaces (552) such as flaps. A control rotor (554) is attached to the trailing edge of the tail at the center of that edge. As shown here, the control rotor may be oriented so that it pushes air downward. In various embodiments, the control rotor (554) is a fixed rotor or a tilt rotor. In some embodiments, if the control rotor is a tilt rotor, there would be no leading edge rotors (556). The tail also includes two tail rotors (556) which are attached to the leading edge of the tail. In some embodiments, the leading edge rotors (556) are fixed rotors.

Figure 5E:
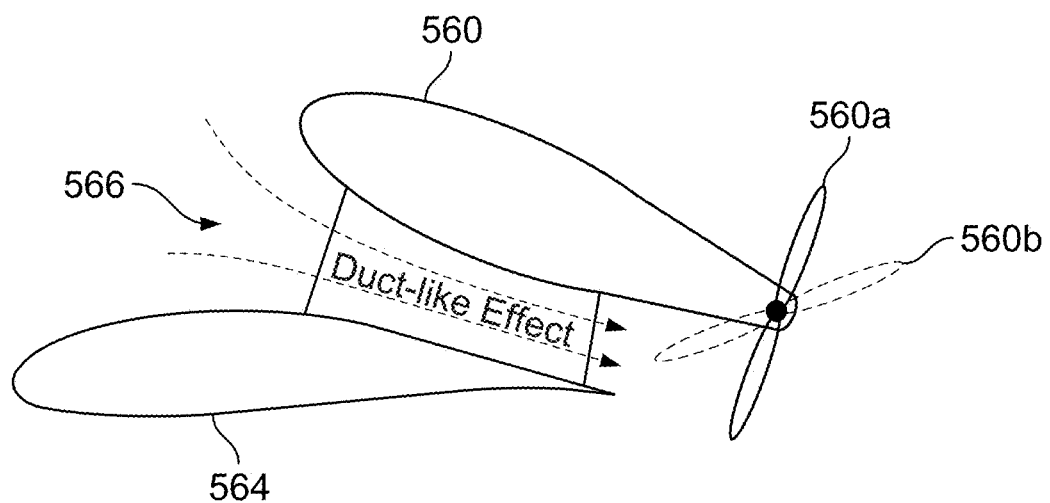
FIG. 5E is a diagram illustrating an embodiment of a pylon which is attached to the top surface of the main wing.

FIG. 5E is a diagram illustrating an embodiment of a pylon which is attached to the top surface of the main wing. There are a variety of ways to attach the main wing rotors to the main wing and this is merely one example. In this example, the main wing rotors (560a/560b) are attached to a pylon (562). The pylon, in turn, is attached to the top surface of the main wing (564) where there is a gap (566) between the pylon and the main wing. As a result, there is a duct-like effect at gap 566 between the pylon (562) and the main wing (564). In addition, offsetting the pylons from the wing's upper surface leads to additional lift and lower drag on the wing surface, at the expense of increased drag on the pylon skin.

As shown here, the back of the pylon (562) is where the rotor (560a/560b) extends beyond the back of the main wing (564). This permits sufficient clearance for the rotor to rotate without hitting the main wing when in cruise position (see rotor 560a), in hover position (see rotor 560b), or in any position in between the two extremes.

As described above, in some embodiments, the canard rotors (if there are any) and main wing rotors are tilt rotors and the rotors are able to switch (if desired) between two positions for more efficient flight. (A corollary to this is that slow flight (e.g., below stall speed for a traditional fixed wing) may be maintained by varying the degree of tilt rather than tilting only between the two extreme or terminal positions.) The following figures describe exemplary tilt transitions of the rotors between cruise position and hover position.

Figure 6A:
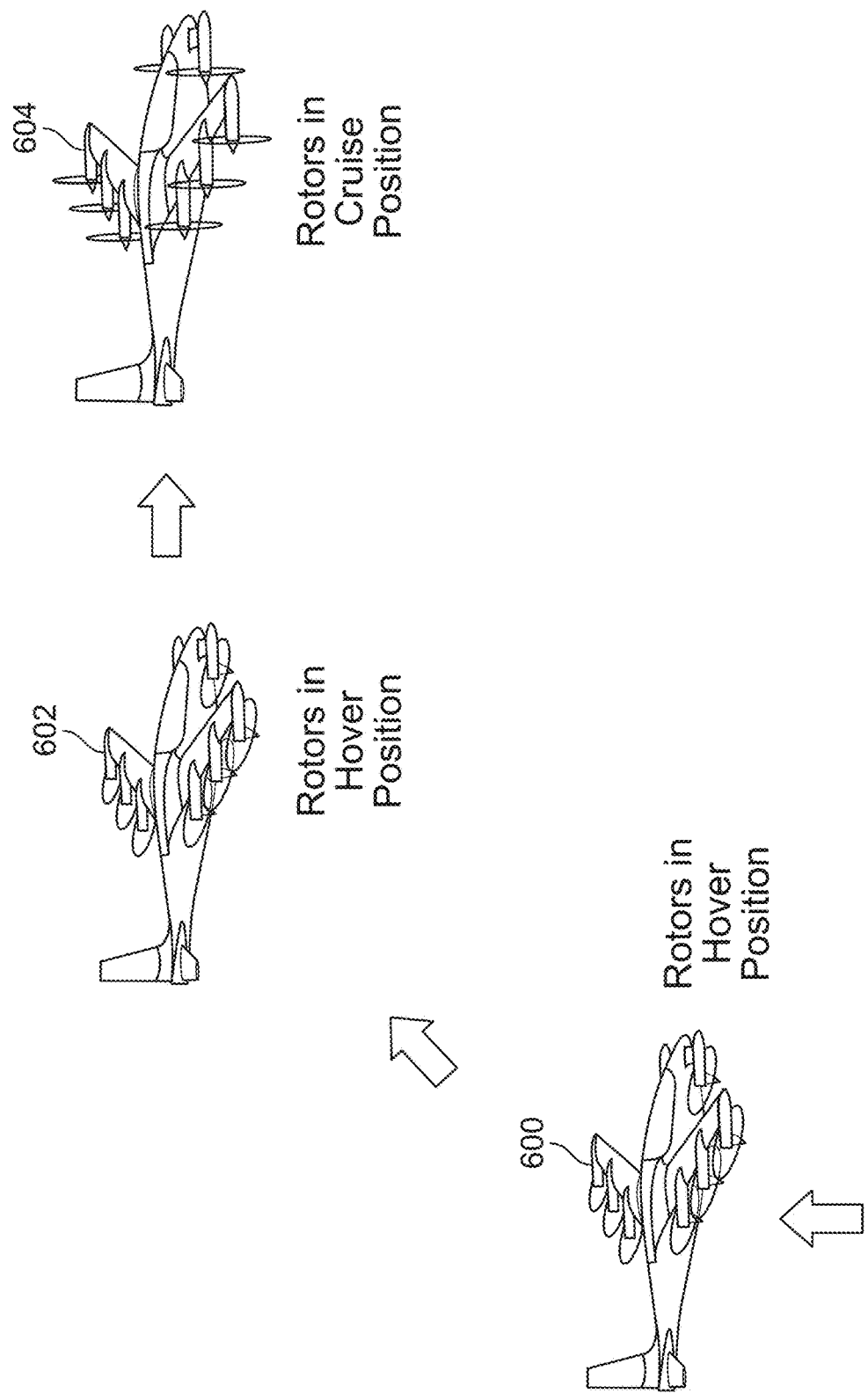
FIG. 6A is a diagram illustrating an embodiment of a takeoff tilt change from hover position to cruise position.

FIG. 6A is a diagram illustrating an embodiment of a takeoff tilt change from hover position to cruise position. In some embodiments, the exemplary multicopter performs this transition soon after taking off (e.g., substantially vertically). It is noted that this tilt transition is optional and the aircraft may fly entirely with the rotors in the hovering position (albeit with less than optimal performance). For example, this could be done if there is risk in the tilting action, and it would be better to take the action at a higher altitude.

Multicopter 600 shows the exemplary aircraft after it has performed a vertical takeoff. In this state shown here, the main wing rotors and canard rotors are in hover position (e.g., rotating about a substantially vertical axis of rotation so that the rotors generate substantially downward thrust).

The multicopter then transitions from an entirely upward direction of movement to a direction of movement with at least some forward motion with the rotors remaining in the hover position until the multicopter reaches some desired altitude at which to begin the transition (602). In other words, the vehicle transitions first, and then changes the tilt of the rotors. In one example, the altitude at which the multicopter begins the rotor tilt change from hover position to cruise position is an altitude which is sufficiently high enough for there to be recovery time in case something goes wrong during the transition. Switching the rotors between hover position and cruise position is a riskier time where the likelihood of something going wrong (e.g., a rotor failing, a rotor getting stuck, etc.) is higher. Although the multicopter may have systems and/or techniques in place for recovery (e.g., compensating for a rotor being out by having the remaining rotors output more thrust, deploy a parachute, etc.), these systems and/or techniques take time (i.e., sufficient altitude) to work.

From position 602, the multicopter flies substantially forward and moves the tilt rotors from a hover position (e.g., where thrust is output substantially downward) to a cruise position. Once in the cruise position 604, the rotors rotate about a substantially longitudinal axis so that they output backward thrust.

Figure 6B:
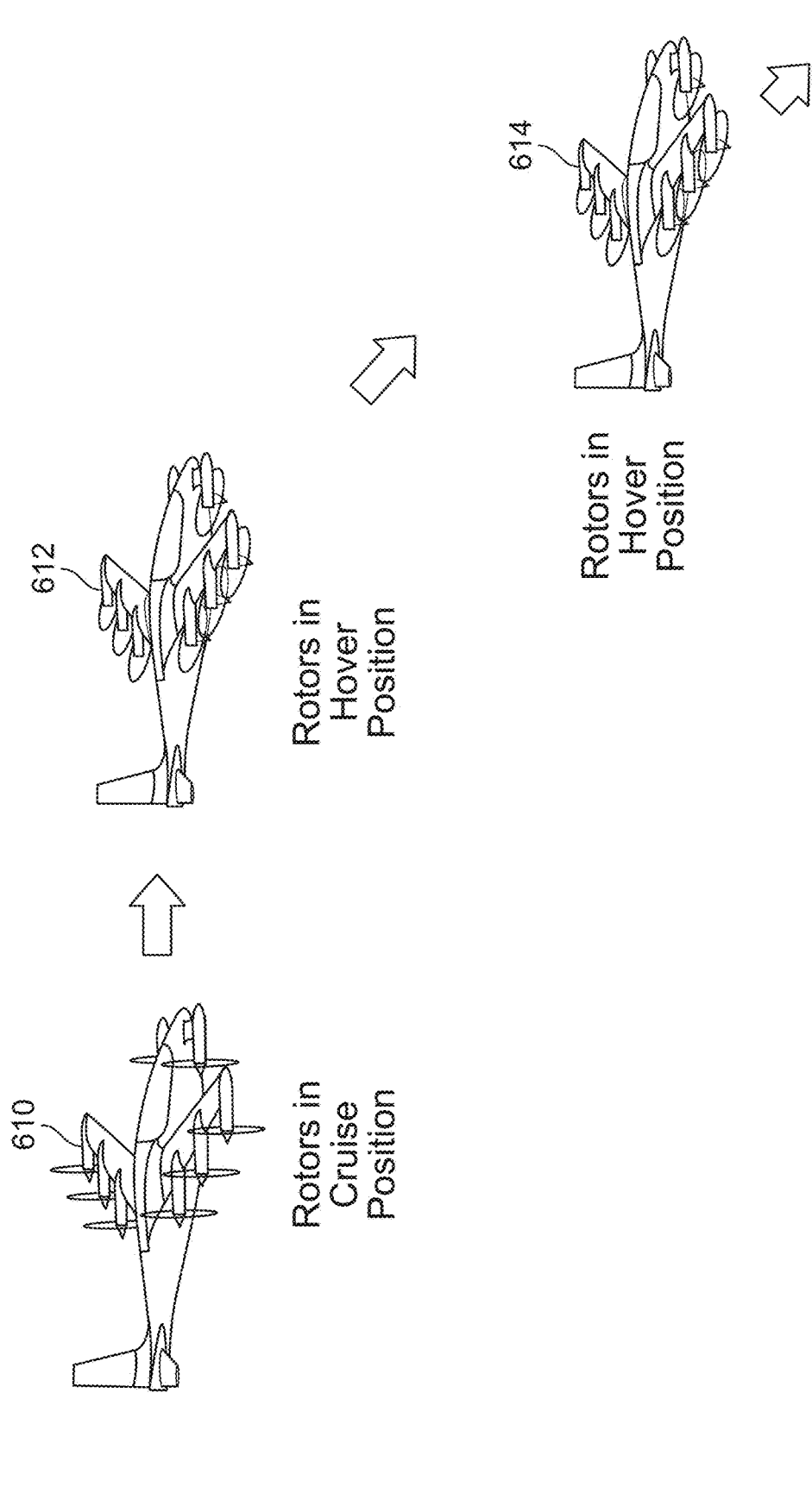
FIG. 6B is a diagram illustrating an embodiment of a landing tilt change from cruise position to hover position.

FIG. 6B is a diagram illustrating an embodiment of a landing tilt change from cruise position to hover position. For example, the exemplary multicopter may perform this transition before landing vertically. As with the previous transition, this transition is optional. For example, the exemplary multicopter can keep the tilt rotors in cruise position and perform a glider-like landing as opposed to a vertical landing if desired.

Multicopter 610 shows the rotors in a cruise position. While flying in a substantially forward direction, the tilt rotors are moved from the cruise position shown at 610 to the hover position shown at 612. With the tilt rotors in the hover position (612), the multicopter descends with some forward movement (at least in this example) so as to keep power use low (er) and retain better options in the case of a failure of a motor or other component (e.g., the multicopter can power up the rotors and pull out of the landing process or path) to position 614 until it finally lands on the ground.

Figure 7:
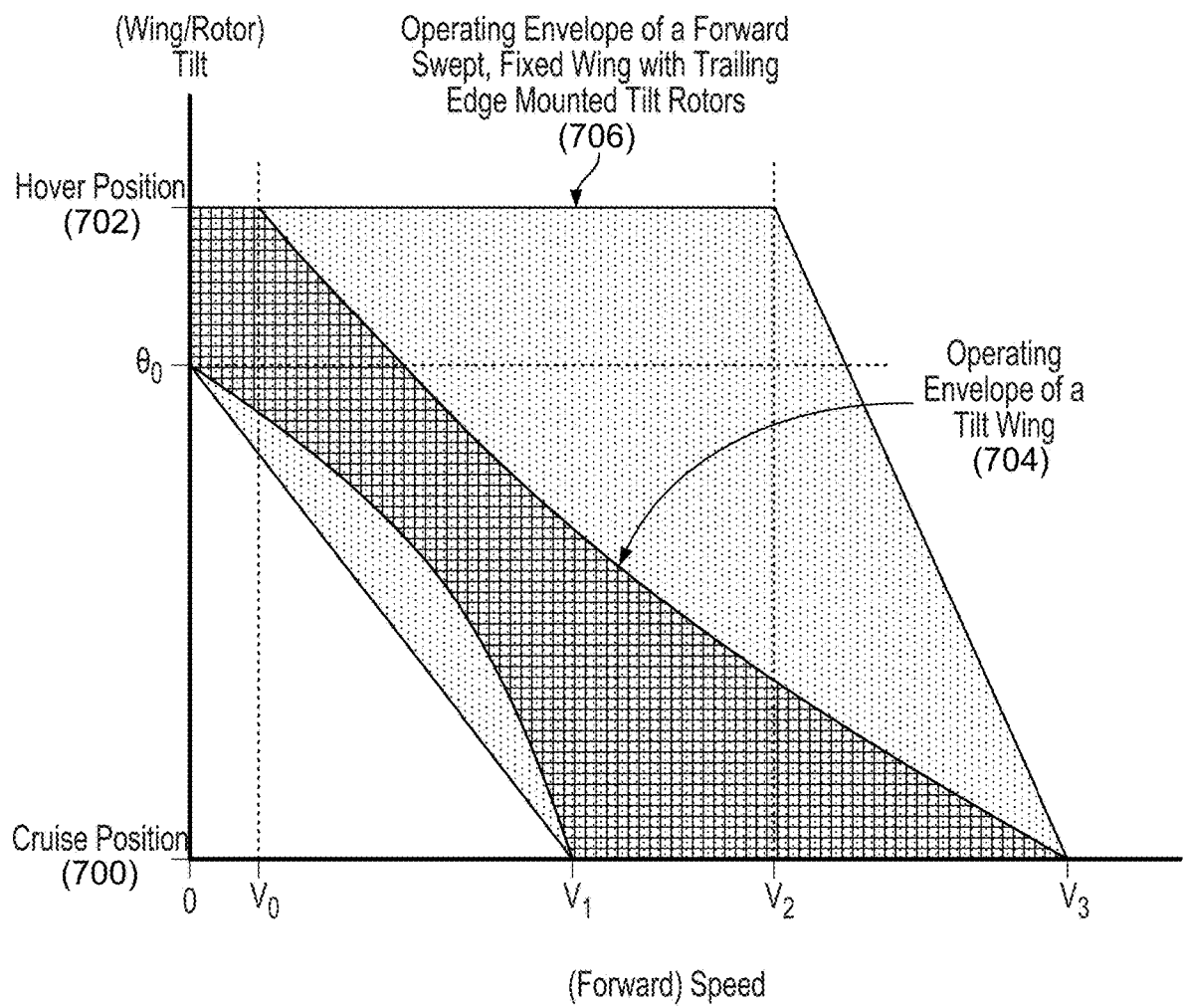
FIG. 7 is a diagram illustrating an embodiment of a velocity tilt diagram.

FIG. 7 is a diagram illustrating an embodiment of a velocity tilt diagram. In the diagram shown, the x-axis shows the forward speed of the aircraft and the y-axis shows the tilt (e.g., position or angle of the tilt wing or tilt rotors) which ranges from a (e.g., minimal) cruise position (700) to a (e.g., maximal) hover position (702).

The first operating envelope (704), shown with a solid border and filled with a grid pattern, is associated with a tilt wing aircraft. See, for example, multicopter 400 in FIG. 4 and tilt wing 302 and fixed rotor 300 in FIG. 3A. The second operating envelope (706), shown with a dashed border and gray fill, is associated with an (e.g., comparable) aircraft with a forward swept and fixed wing with trailing edge mounted tilt rotors. See, for example, the embodiments described above.

In the diagram shown here, the tilt rotor operating envelope (706) is a superset of the tilt wing operating envelope (704) which indicates that the former aircraft configuration is safer and/or more airworthy than the latter and is also able to fly both faster and slower at comparable tilt positions. With a fixed wing, the wing is already (and/or always) pointed in the direction of (forward) travel. When the tilt rotors are at or near the (e.g., maximal) hover position (702), the vehicle can fly pretty much all the way up to the stall speed (e.g., $V_2$) without having to tilt the motors up to cruise position. Note, for example, that the tilt rotor operating envelope (706) can stay at the (e.g., maximal) hover position (702) all the way up to $V_2$. This greatly increases the operating regime of the tilt rotor operating envelope (706) compared to the tilt wing operating envelope (704). Note for example, all of the gray area above the tilt wing operating envelope (704).

Another effect which can contribute to the expanded operating envelope for the tilt rotor configuration at or near hover position includes flow turning (see, e.g., FIG. 4). The flow turning over the main wing induces some extra lift. In some embodiments, this flow turning and its resulting lift are amplified or optimized by tilting the main wing rotors at a slight backward angle from directly down when in a normal hover (e.g., at minimal tilt position 700).

In contrast, a tilt wing presents a large frontal area when the tilt wing is tilted up in (e.g., maximal) hover position (702). As a result, tilt wings are unable to fly forward at any kind of decent speed until at or near the full (e.g., minimal) cruise position (700) or nearly so.

The following figures illustrate more detailed embodiments of a forward swept, fixed wing aircraft with tilt rotors, including some optional features not described above.

Figure 8A:
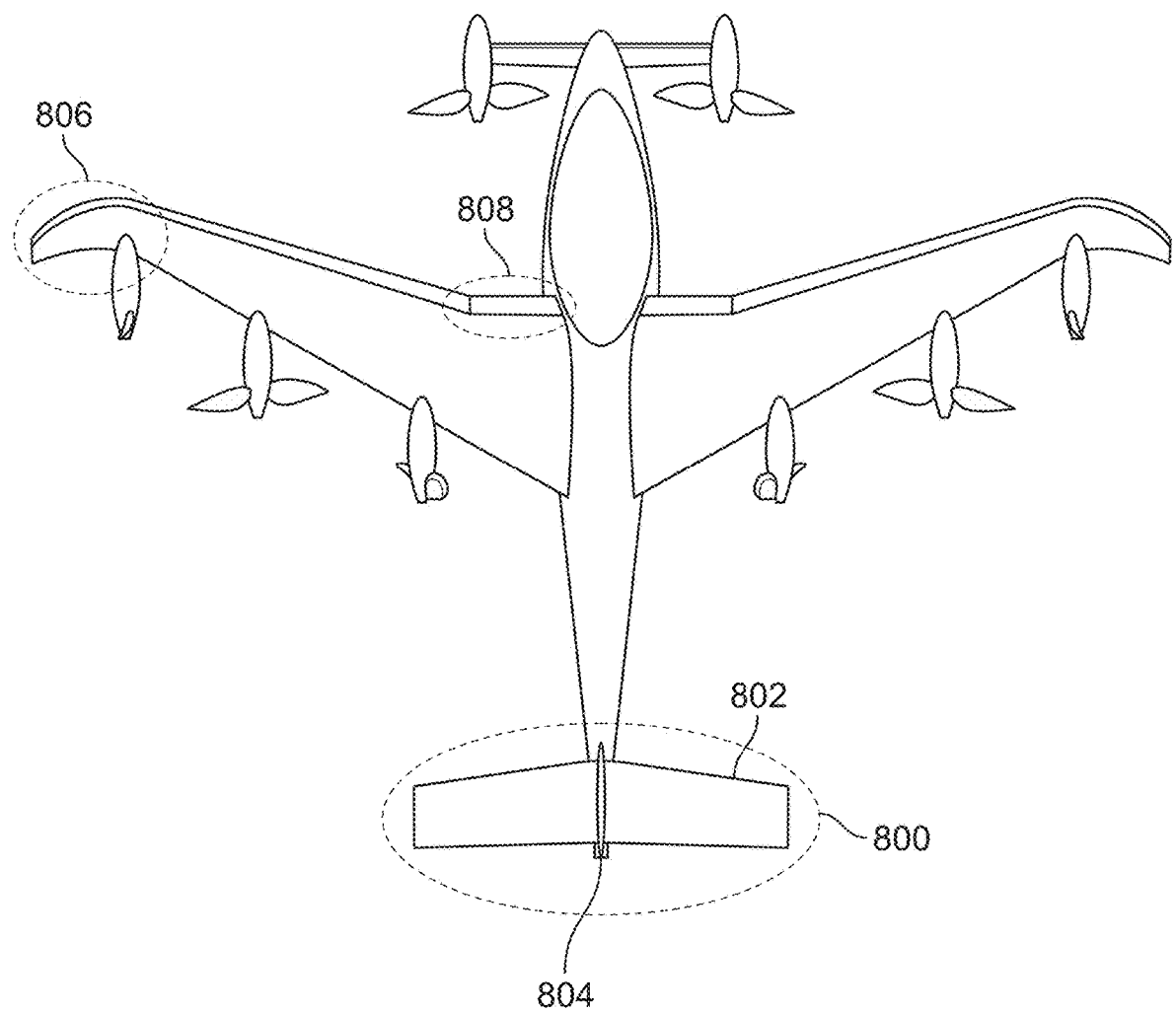
FIG. 8A is a top view of an aircraft embodiment with a three-element tail.

FIG. 8A is a top view of an aircraft embodiment with a three-element tail. In the example shown, the exemplary multicopter includes a tail (800) with three elements: two horizontal stabilizers (802) and a single vertical stabilizer (804). The tips (806) of the main wing in this example are curved. For example, this may help to better capture forced airflow from the tip of the propellers, as well as adding to the wing aspect ratio. This results in lower induced drag and higher available lift for a given power input. An additional benefit is protecting tip propeller blades from lateral strikes while conducting hover operations close to structures. The main wing also includes a shoulder (808) which widens the part of the main wing which connects to the fuselage and helps structurally.

Figure 8B:
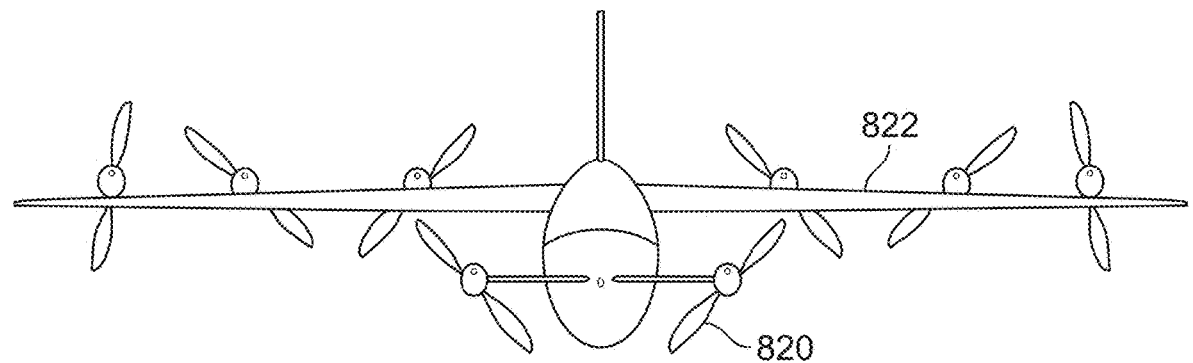
FIG. 8B is a front view of an aircraft embodiment with a three-element tail.

FIG. 8B is a front view of an aircraft embodiment with a three-element tail.

FIG. 8B continues the example of FIG. 8A. As shown here, the canard rotors (820) are positioned so that they are below the (plane of the) main wing (822). This positioning of the canard rotors improves the thrust line in cruise and reduces interaction between the canard rotors (820) and the main wing (822).

Figure 8C:
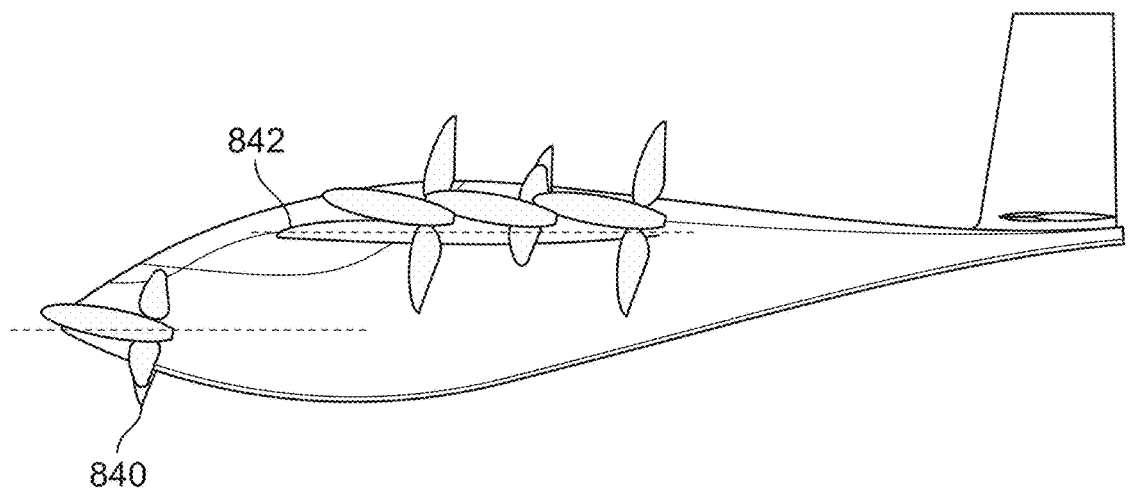
FIG. 8C is a side view of an aircraft embodiment with a three-element tail.

FIG. 8C is a side view of an aircraft embodiment with a three-element tail. As this view shows, the canard rotors (840) are positioned so that they are below the (plane of the) main wing (842).

Figure 9A:
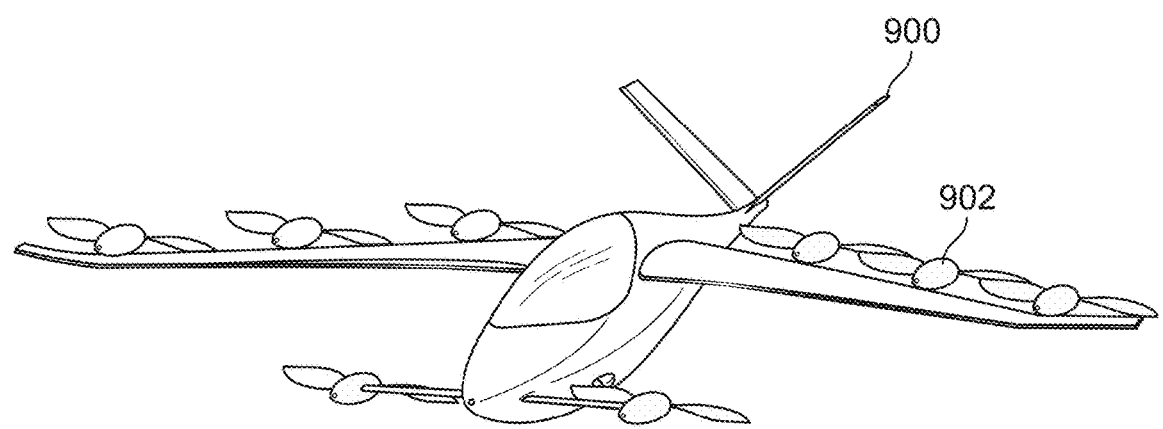
FIG. 9A is an angled view of an aircraft embodiment with a V tail.

FIG. 9A is an angled view of an aircraft embodiment with a V tail. In this example, the multicopter has a V tail (900). One benefit to a V tail (900) is that it helps to avoid interactions between the main wing rotors (902) and the surfaces of the tail (900). The following figure shows a front view which more clearly illustrates this.

Figure 9B:
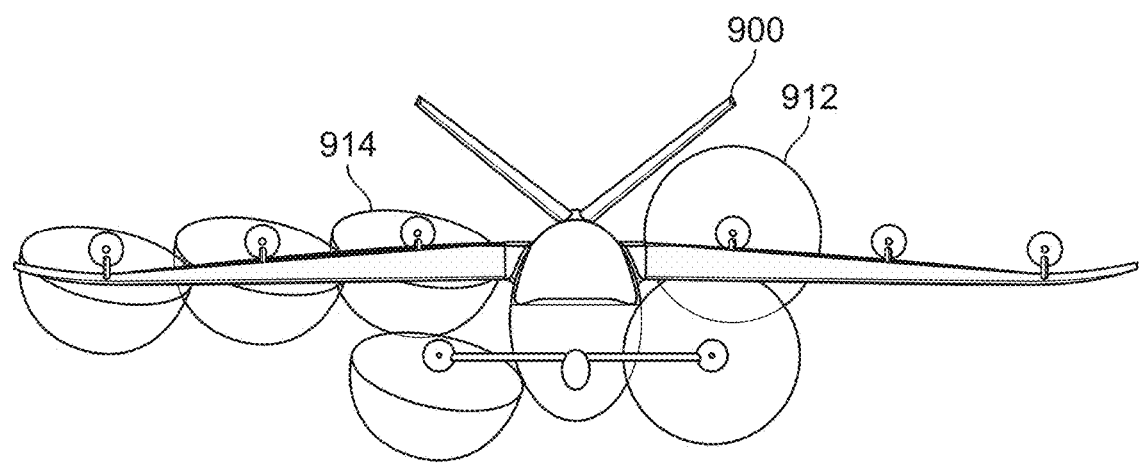
FIG. 9B is a front view of an aircraft embodiment with a V tail.

FIG. 9B is a front view of an aircraft embodiment with a V tail. FIG. 9B continues the example of FIG. 9A. As shown from this view, the V tail (910) rises above the main wing rotors as it extends outward from the fuselage to the tip of the wing. As a result, even when the main wing rotors are in cruising position (912), the V tail (910) is not directly behind and/or directly in the wake of the main wing rotors (912). This minimizes the interactions between the main wing rotors (912) and the V tail's surfaces (910).

This view also shows that (in this embodiment at least) the main wing rotors in hover (914) are angled or otherwise tilted slightly backward and slightly outward. As described above, this may be desirable because it allows at least some aircraft embodiments to fly in a "magic carpet mode" where the rotors are still in a hover tilt position, but can transition to primarily wing borne flight. The following figure shows an example of this.

Figure 10:
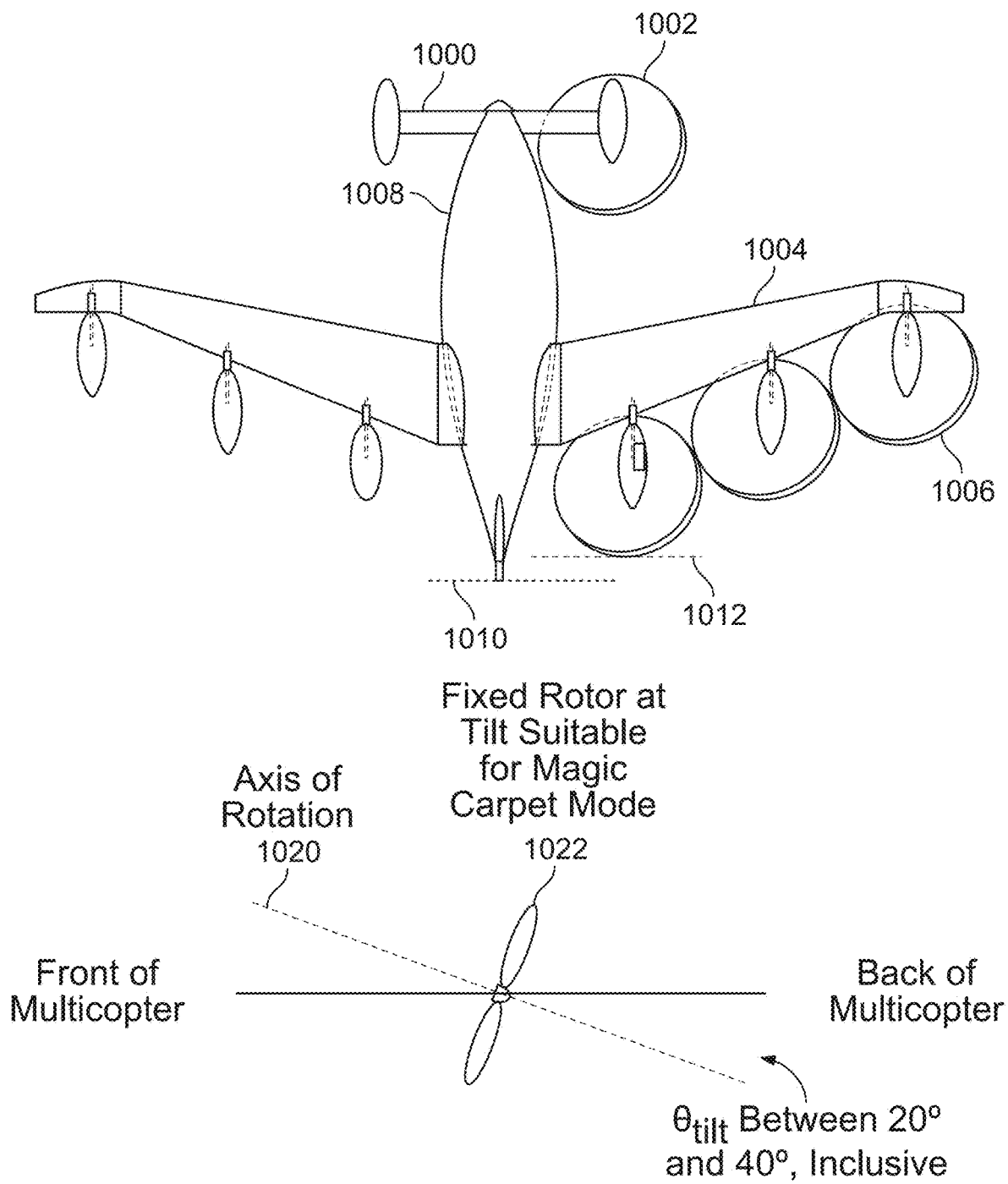
FIG. 10 is a diagram illustrating an embodiment of a multicopter with a truncated fuselage which is capable of flying in a magic carpet mode.

FIG. 10 is a diagram illustrating an embodiment of a multicopter with a truncated fuselage which is capable of flying in a magic carpet mode. As used herein, the term magic carpet mode refers to a mode in which the rotors are still in a hovering orientation, but the vehicle has been accelerated to an airspeed where a substantial amount of lift is generated by the wing. In the magic carpet mode, the vehicle speed can be controlled with forward pitch, and altitude can be controlled either by increasing speed to gain efficiency and thus climb rate, or by directly adding thrust to the rotors. In the example shown, the multicopter has a canard (1000) with two canard rotors (1002). The main wing (1004), which is a fixed wing with a forward sweep, has six main wing rotors (1006) which are attached to the trailing edge of the main wing. The fuselage (1008) is relatively short and is referred to herein as a truncated fuselage. For example, note that the end of the fuselage (1010) extends only a little bit past the end of the backmost rotor (1012). In this particular embodiment, the rotors are fixed and do not tilt or otherwise change position.

There are a variety of multicopter embodiments which are capable of meeting stringent weight requirements (e.g., an ultralight standard). In this approach, the truncated fuselage is much shorter and there is no tail per se, both of which keep the weight down. The use of fixed rotors (e.g., as opposed to tilt rotors) also keeps the weight down. The truncated fuselage and lack of a tail also produces a smaller footprint which helps with transport (e.g., in a trailer) and the amount of space required for takeoff and/or landing.

In some embodiments, the rotors are at a fixed position tilted back, more on the hover end of the tilt spectrum as opposed to the cruise end of the tilt spectrum (e.g., an axis of rotation that is tilted downward from horizontal at an angle between 20° to 40°, inclusive). See, for example, the axis of rotation (1020) associated with fixed rotor (1022) where the tilt angle is between 20° to 40° which is suitable and/or acceptable for magic carpet mode. For example, this rotor position (although fixed) permits the exemplary multicopter to fly vertically (e.g., not due to aerodynamic lift on the wing, but from the airflow produced by the rotors) as well as forwards (e.g., off the wing). This ability or mode of keeping the rotors in a hover-style tilt while flying (e.g., primarily and/or mostly) in a wing borne manner is sometimes referred to as a fly magic carpet mode. It is noted that this ability to fly in a magic carpet mode is not necessarily limited to fixed rotor embodiments. For example, some or all of the above tilt rotor embodiments may be flown in magic carpet mode (e.g., where the tilt position is the extreme or maximal hover position, or some tilt position between the two extremes).

Figure 11A:
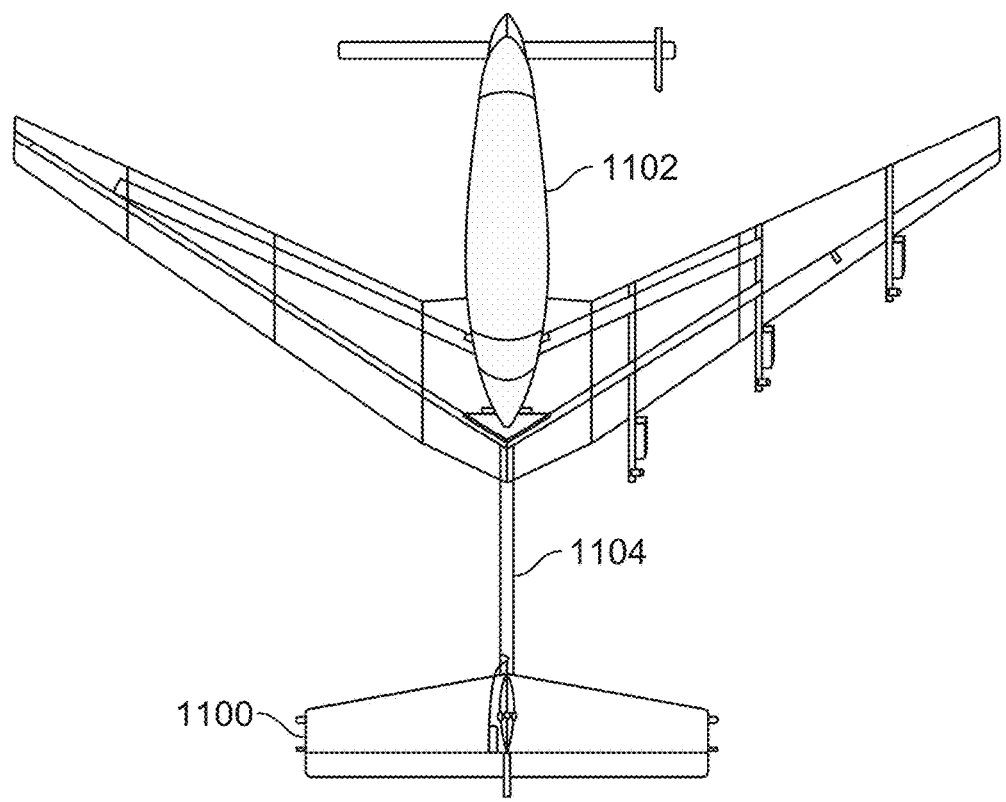
FIG. 11A is a top view of a multicopter embodiment with a truncated fuselage and tail.

FIG. 11A is a top view of a multicopter embodiment with a truncated fuselage and tail. The embodiment shown here has similarities with the previous multicopter embodiment shown in FIG. 10 and for brevity shared features are not discussed herein. Unlike the previous example, this embodiment has a tail (1100). The fuselage (1102) is a truncated fuselage so the tail (1100) and fuselage (1102) are connected using a boom (1104).

Figure 11B:
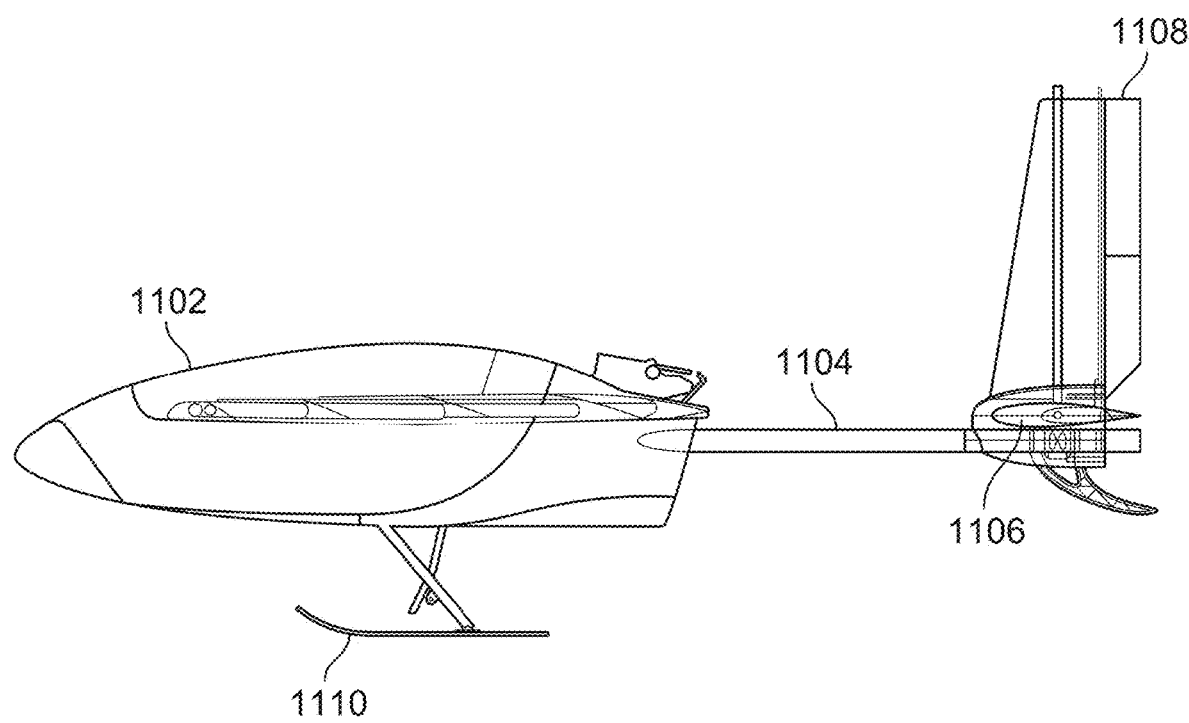
FIG. 11B is a side view of a multicopter embodiment with a truncated fuselage and tail.

FIG. 11B is a side view of a multicopter embodiment with a truncated fuselage and tail. FIG. 11B continues the example of FIG. 11A. From this view, other features of the multicopter, including a horizontal control surface (1106) and a vertical control surface (1108) on the tail and ski-like landing gear (1110) are more clearly shown.

Returning briefly to FIGS. 8A-8C, it would be desirable if the performance of the vehicle shown in those figures could be further improved upon. The following figures describe an alternate vehicle embodiment which has better control and/or stability during a stall (e.g., a partial stall or a deep stall). For convenience and ease of explanation, multiple features and/or improvements are shown in a single exemplary vehicle described below. Naturally, in some embodiments, not all of the features and/or improvements described below appear in the same vehicle together.

Figure 12A:
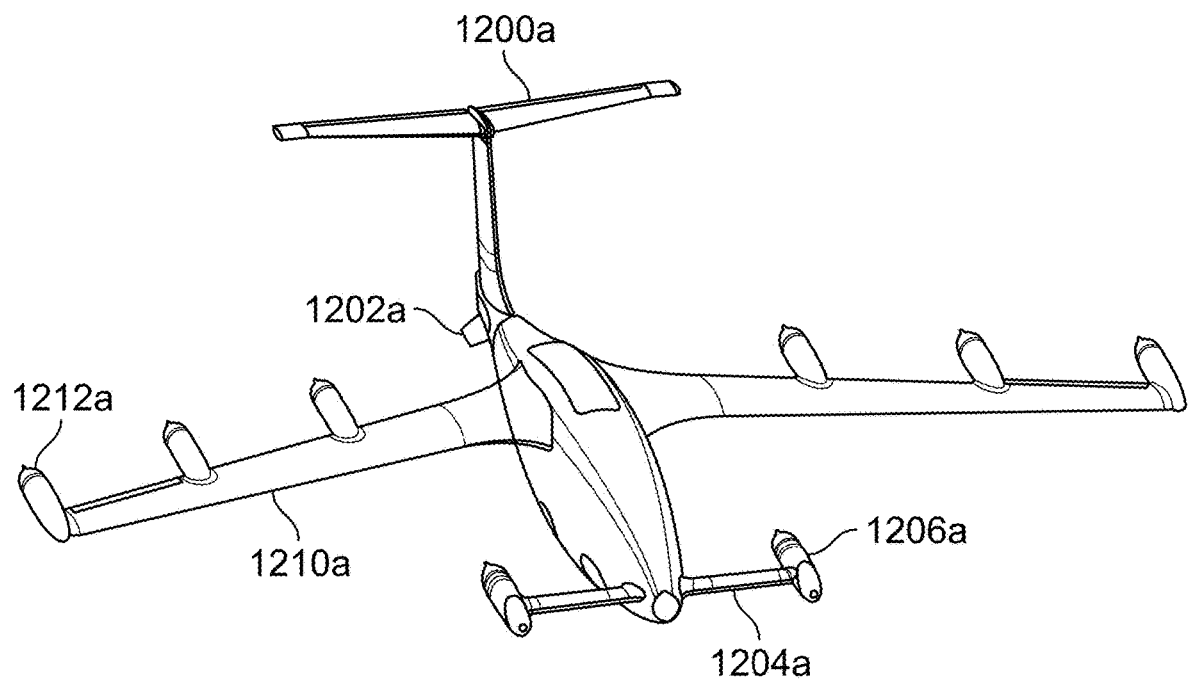
FIG. 12A is a perspective view of an embodiment of a tilt rotor vehicle with features for improved flight control and/or stability.

FIG. 12A is a perspective view of an embodiment of a tilt rotor vehicle with features for improved flight control and/or stability. To better show the features of this exemplary vehicle, the blades of the tilt rotors are not shown in this figure and the following figures. As described above, the blades (not shown) are attached at the distal and/or aft end of the pylons (1206a and 1212a). In this exemplary vehicle, the tail (1200a) is a T-tail (alternatively, it may be referred to as a 2-element tail) as opposed to the more conventional arrangement shown in FIGS. 8A-8D (e.g., with three elements in the tail: two horizontal and one vertical). As such, when the vehicle is level (e.g., during forward flight) the horizontal surface of the T-tail is higher than the main wing (1210a), to which six tilt rotors are attached using pylons (1212a), and also higher than the canard (1204a), to which two tilt rotors are attached using pylons (1206a).

The example vehicle shown here also includes dovetails (1202a) which are small fins on the bottom of the fuselage towards the back of the vehicle. In some embodiments, in addition to aerodynamic benefits during flight (described in more detail below), the dovetails in this example vehicle have the (added) benefit of acting as a tail skid on which the fuselage rests when the vehicle is on the ground. For example, to land, the example vehicle would perform more of a vertical landing as opposed to a gliding landing. Since a more vertically oriented landing is performed, this eliminates the need for a wheel and having the dovetail perform double duty keeps the weight of the vehicle (which may be in the ultralight category) down.

Alternatively, in some other embodiments, a vehicle has (e.g., in addition to or as an alternative to the dovetail for landing) landing gear (e.g., including a wheel, retractable or non-retractable) or a rear skid. A rear or tail skid is desirable in some applications because a tail skid would work for both a gliding landing as well as a vertical landing and the tail skid permits the vehicle be moved around (e.g., on one or more skids) if desired. Conversely, a (tail) skid may be undesirable in some applications because it may require repair or replacement if the vehicle performs a hard landing.

The vehicle also includes a canard (1204a) that is narrower (e.g., 10-15%) and attached further aft (e.g., 2-5%) compared to other canard embodiments (e.g., that shown in FIG. 8A-FIG. 8C). As will be described in more detail below, these features and/or design changes help with control and/or stability of the vehicle in various flight scenarios.

Figure 12B:
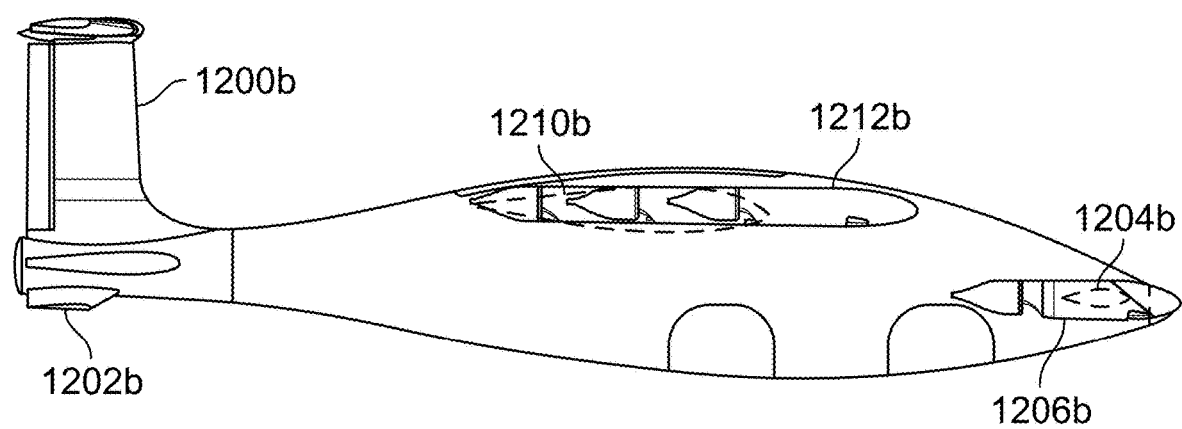
FIG. 12B is a side view of an embodiment of a tilt rotor vehicle with features for improved control and/or stability.

FIG. 12B is a side view of an embodiment of a tilt rotor vehicle with features for improved control and/or stability. FIG. 12B shows the vehicle from FIG. 12A but from a different view. From this view, the T-tail (1200b) and dovetail (1202b) are (still) visible. In contrast, the canard (1204b) and the main wing (1210b) are obscured by their pylons (e.g., 1206b and 1212b, respectively) in this view.

Figure 12C:
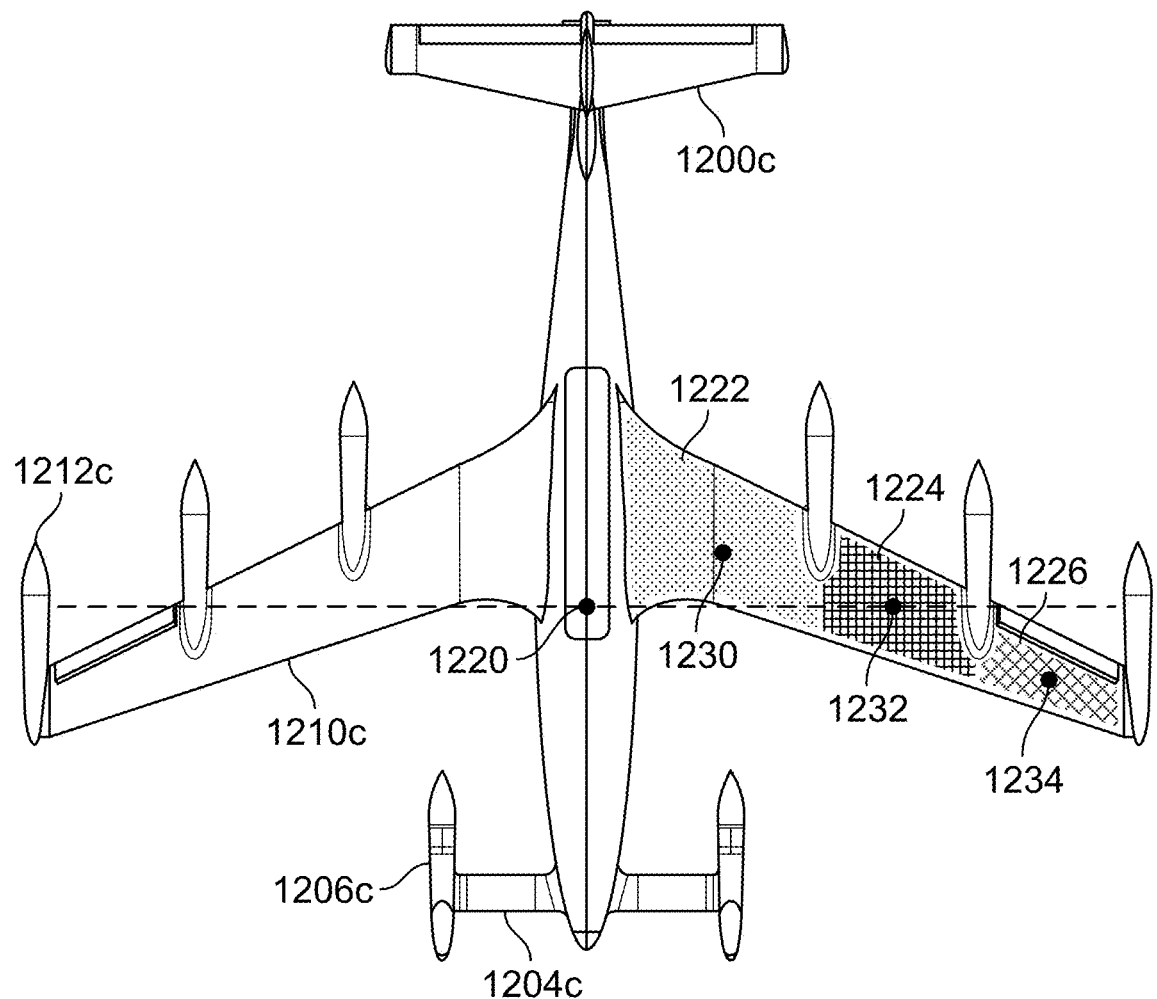
FIG. 12C is a top view of an embodiment of a tilt rotor vehicle with features for improved control and/or stability.

FIG. 12C is a top view of an embodiment of a tilt rotor vehicle with features for improved control and/or stability. From this view, the T-tail (1200c), canard (1204c), the pylons (1206c) that are attached to the canard, the main wing (1210c), and the pylons (1212c) that are attached to the main wing are all visible. The dovetails (not shown) are blocked from view by the T-tail (1200c).

Figure 12D:
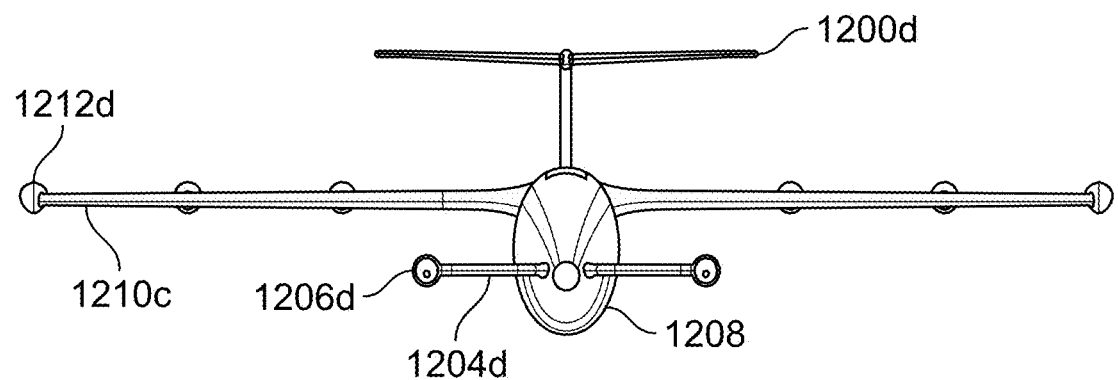
FIG. 12D is a front view of an embodiment of a tilt rotor vehicle with features for improved control and/or stability.

FIG. 12D is a front view of an embodiment of a tilt rotor vehicle with features for improved control and/or stability. From this view, the T-tail (1200d), canard (1204d), the pylons (1206d) that are attached to the canard, the main wing (1210d), and the pylons (1212d) that are attached to the main wing are all visible. The dovetails (not shown) are blocked from view by the fuselage (1208).

Figure 12E:
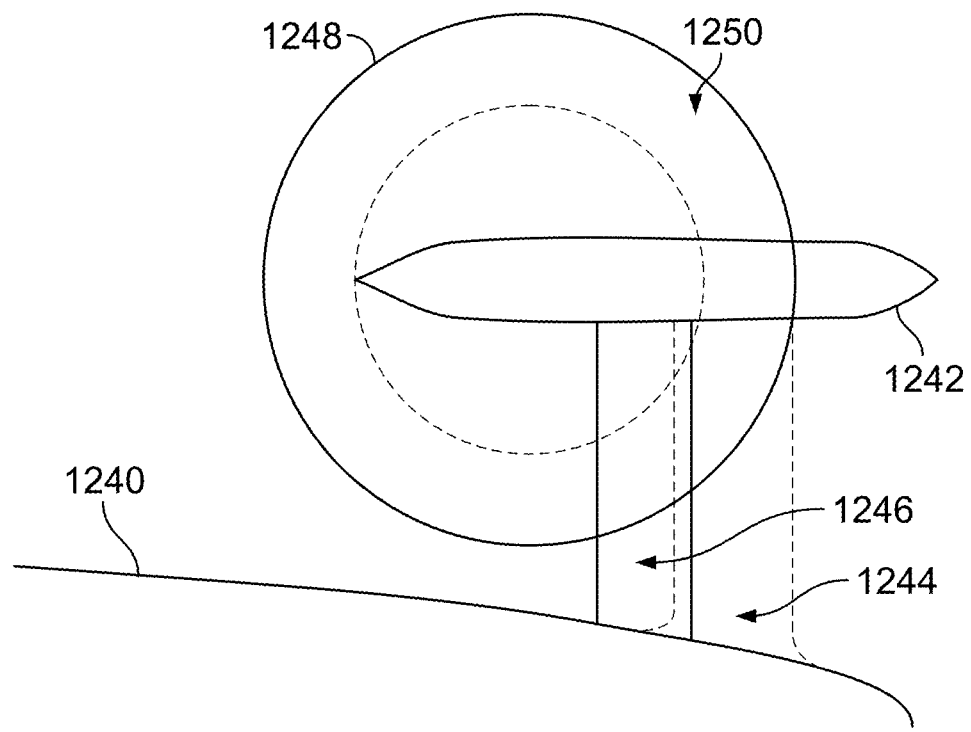
FIG. 12E is a top view of an embodiment of a tilt rotor vehicle with a narrower canard that is attached further aft compared to previous canards.

FIG. 12E is a top view of an embodiment of a tilt rotor vehicle with a narrower canard that is attached further aft compared to previous canards. In this example, fuselage 1240 and pylon 1242 are connected by two pylon embodiments: a wider (e.g., from fore to aft) canard (1244) that attaches the fuselage (1240) and pylon (1242) at a more forward position and a narrower canard (1246) that attaches the fuselage (1240) and pylon (1242) at a more aft position. (Note: the wider, more forward canard (1244) is drawn with dashed lines and the narrower, more aft canard (1246) is drawn with solid lines.) In one example, the new canard has leading and trailing edges within the following ranges relative to the front tip of the pylon (e.g., 0% corresponds to the front tip of the pylon and 100% corresponds to the aft tip of the pylon):

TABLE 1

Example position ranges of leading edge and trailing edge for canard 1246 in FIG. 12E.

| Canard Edge | Position Range Relative to Pylon |
| --- | --- |
| Leading Edge | 40% to 60% |
| Trailing Edge | 55% to 80% |

One benefit to the narrower canard (1246), which is a later and improved version of the wider canard (1244), is that it improves the pitch stability by pushing the lifting surface area further aft and reducing the area in front (forward) of the center of gravity. Another benefit to the narrower canard (1246) is that due to its new, more aft position under the propeller disk (1248), the canard obscures less of the region (1250) that produces the majority of the lift (roughly the outer third of the propeller disk) when the tilt rotors are in a hovering position. This improves the hover efficiency when the tilt rotors are so positioned or oriented. Yet another benefit is that with the canard more aft, the canard is closer to the center of thrust of the rotor which reduces twisting of the canard and increases the frequency of that mode. To put it another way, the position of the newer/narrower canard has a more favorable position with respect to the center of thrust and center of mass (which is good for structural modes).

In some embodiments, the trailing edge of the main wing shaped or otherwise contoured to follow the curve of the propeller to (further) improve efficiency during hover mode. The following figure shows an example of this.

Figure 12F:
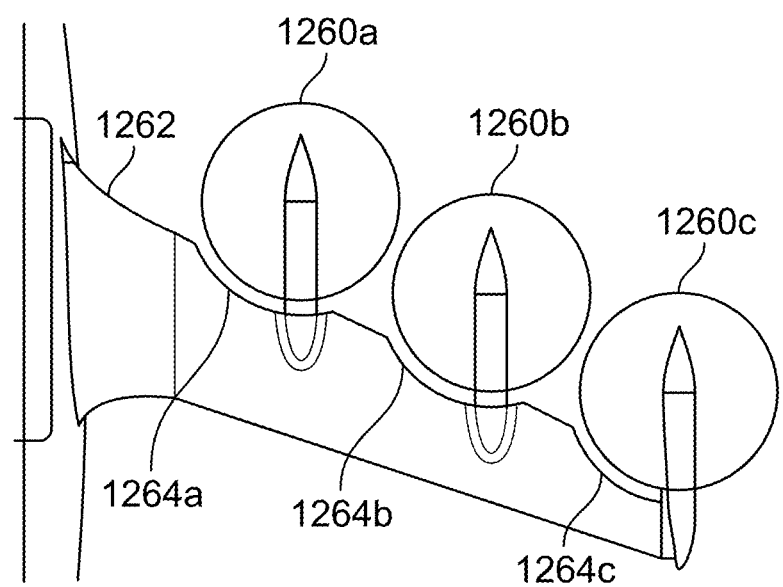
FIG. 12F is a top view of an embodiment of a main wing where the trailing edge is parallel to the curve of the propeller disks when the tilt rotors are in a hovering position.

FIG. 12F is a top view of an embodiment of a main wing where the trailing edge includes a curved section that is parallel to the curve of the propeller disks when the tilt rotors are in a hovering position. In this example, circles 1260a-1260c show the circular areas occupied by the propeller disks when the tilt rotors are in a hovering (i.e., downward facing) position. The trailing edge (1262) of the main wing has three curved and/or circular sections (1264a-1264c) which follow and/or run parallel to the curve of the propellers disks (1260a-1260c). As a result of these curved sections, the main wing no longer blocks the downward lift or thrust produced by the propeller disks during hover mode which helps the vehicle fly more efficiently in this mode.

As described above, analysis and flight testing of the vehicle with the horizontal tail shown in FIGS. 8A-8C revealed undesirable flight performance in certain conditions which the vehicle shown in FIGS. 12A-12D improved upon. The following figure describes this in more detail.

Figure 13:
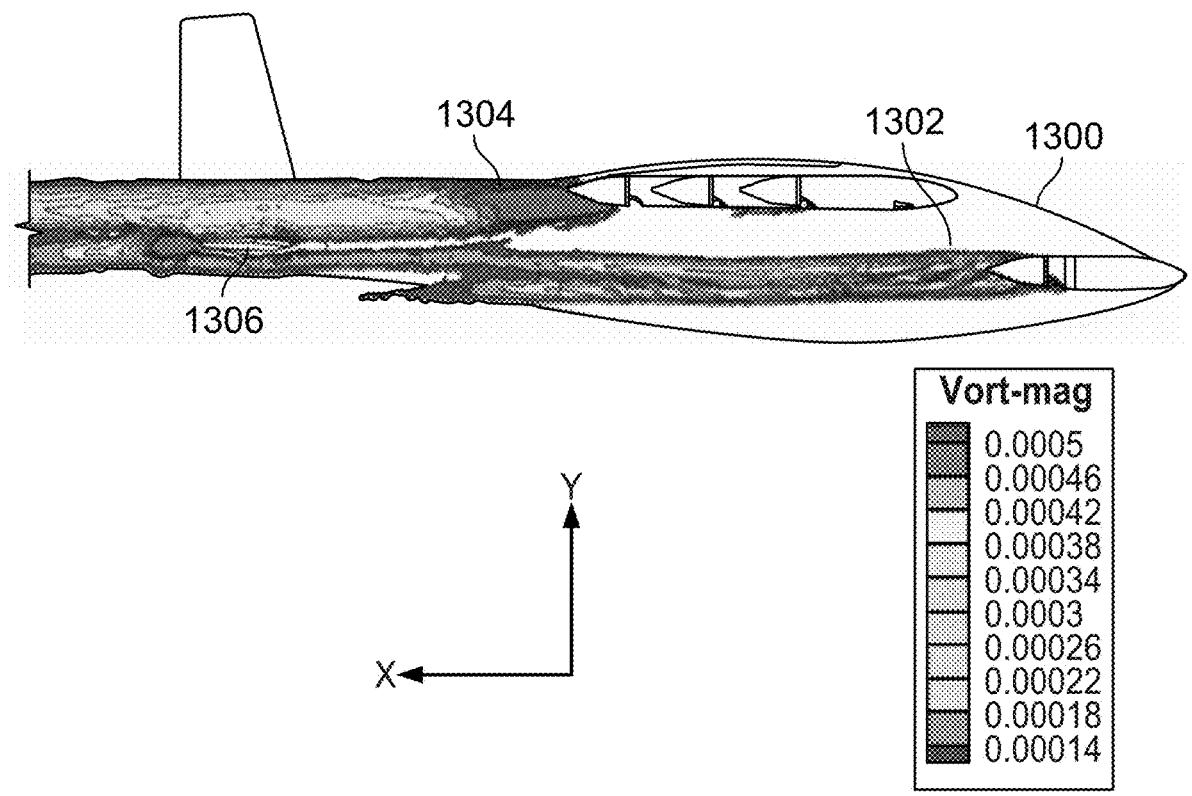
FIG. 13 is a diagram illustrating an embodiment of wake interference during forward flight of a tilt rotor vehicle with a horizontal tail.

FIG. 13 is a diagram illustrating an embodiment of wake interference during forward flight of a tilt rotor vehicle with a horizontal tail. In the example shown, the vehicle (1300) is a tilt rotor vehicle with a horizontal tail (see, e.g., FIGS. 8A-8C). In the state shown here, the vehicle is flying at a (relatively) low angle of attack, sometimes referred to as a forward flight mode. For example, a normal angle of attack for this vehicle may be in the range of −4 degrees to 16 degrees and the angle of attack shown here is approximately 0 degrees. As shown here, the wake (1302) from the canard and the wake (1304) from the main wing interacts (negatively) with the horizontal tail (1306) because the two horizontal airfoils are at a height relatively close to the heights of the canard and the main wing. This wake interference results in pitch instability (at least during forward flight). This is undesirable because if some or all of the automatic control system should fail, the pilot would be required to intervene to keep the pitch steady. Since the vehicle is designed for use by inexperienced pilots, putting this burden on a pilot during an emergency or failure situation is undesirable.

A tilt rotor vehicle with a T-tail (such as that shown in FIGS. 12A-12D) does not experience this wake interference and instability because the horizontal airfoils of a T-tail are much higher than the canard and the main wing. The following figure shows the various wakes for such a vehicle.

Figure 14:
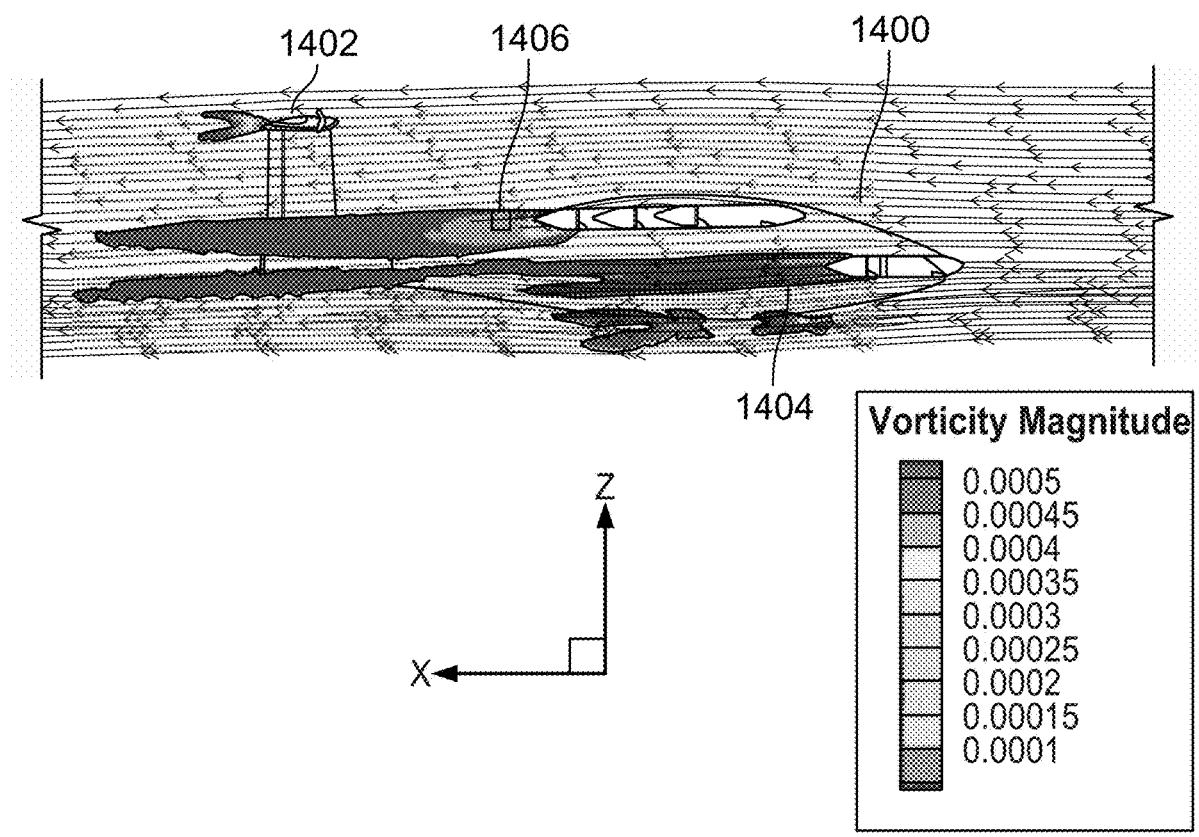
FIG. 14 is a diagram illustrating an embodiment of a tilt rotor vehicle with a T-tail.

FIG. 14 is a diagram illustrating an embodiment of a tilt rotor vehicle with a T-tail. As with the previous figure, the vehicle (1400) is flying at a (relatively) low angle of attack (i.e., is flying in a forward flight mode). However, this vehicle has a T-tail (1402) not a (e.g., conventional) horizontal tail as shown in FIGS. 8A-8C. As such, the wake (1404) from the canard and the wake (1406) from the main wing do not interfere with the horizontal surfaces of the T-tail (1402) because that surface is much higher than the canard and main wing. It is further noted that the T-tail is not subject to any wake from the fuselage (not shown in this figure). As a result, the T-tail provides a good restorative force (and thus good pitch stability) and would not require as much pilot intervention should some or all of the control system fail.

Another (fringe) benefit of using a T-tail is that the horizontal parts act as a fence or cap for the vertical part, improving its aerodynamic efficiency and max force. This allows the vertical portion of the T-tail to be smaller than it would otherwise need to be for aerodynamic stability and authority purposes.

In some embodiments, the T-tail is installed at a height within a range 0.7 to 1.2 meters above the base of the vertical. This range may be attractive or otherwise desirable because limiting the height of the T-tail's horizontal surface produces better structural properties since the vertical portion of the T-tail (which has to transfer the loads) ends up being shorter and "chordier" (that is, wider in the fore-aft direction which increases torsional stiffness for the same or a given thickness) with a lower-mounted tail.

The following figure shows a tilt rotor vehicle with a T-tail in a deep stall and describes how some of the features described above (e.g., in FIGS. 12A-12D) help during a deep stall.

Figure 15A:
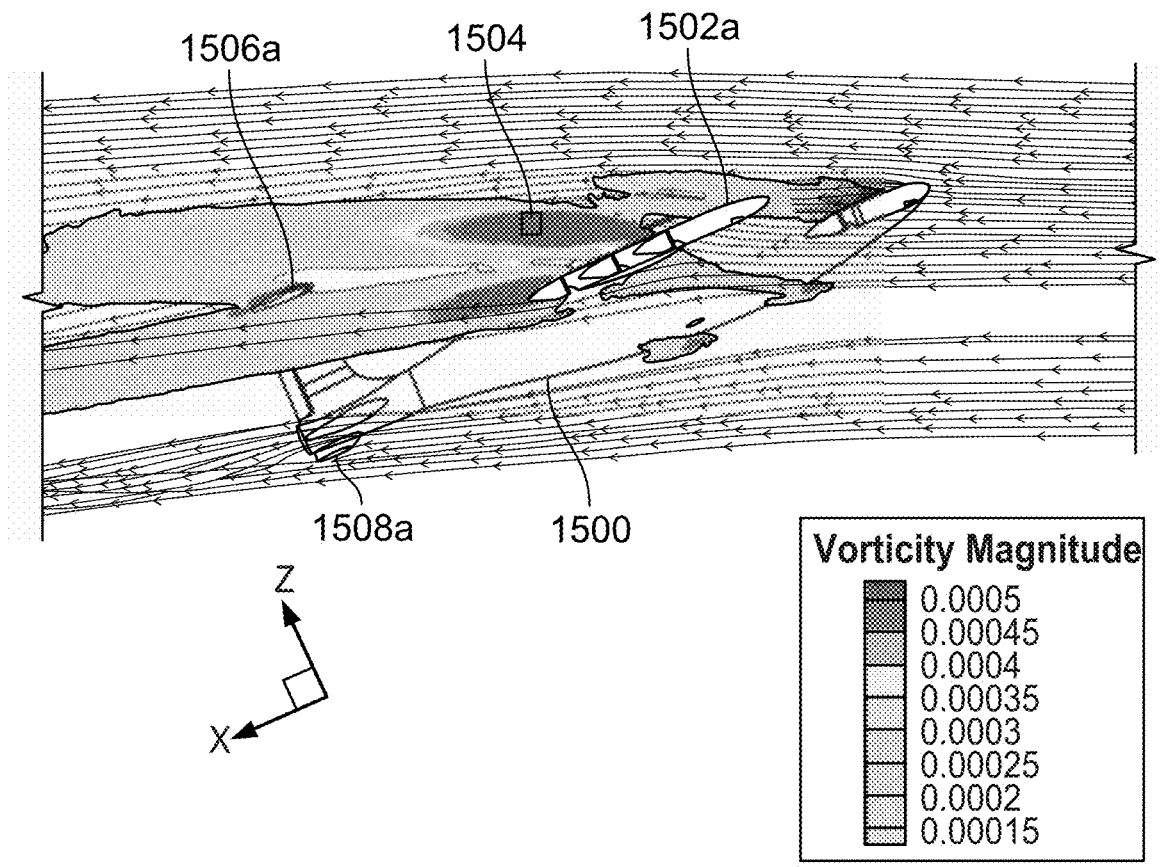
FIG. 15A is a diagram illustrating an embodiment of the streamlines and vorticities of a tilt rotor vehicle with a T-tail in a deep stall.

FIG. 15A is a diagram illustrating an embodiment of the streamlines and vorticities of a tilt rotor vehicle with a T-tail in a deep stall. In the example shown here, the vehicle (1500) has pitched up to such a high angle of attack that the main wing stalls (in this view, the main wing is obscured by the pylons (1502a) that are attached to the main wing). This significantly increases the size of the wake (1504) produced by the main wing as well as turbulence within the wake. This causes the wake (1504) from the main wing to interact with the horizontal tail (1506a), which itself stalls due to the high angle of attack. This scenario is referred to as a "deep stall" and in this situation all pitch control is lost.

In this situation, the dovetails (1508a) on the underside of the fuselage help to stabilize the vehicle. As shown here, while the horizontal stabilizer of the T-tail (1506a) is negatively impacted by the wake (1504) from the main wing, the dovetails (1508a) are located at a lower height and therefore are not (negatively) affected by the wake (1504) from the main wing. The dovetails (1508a) in this scenario will push the nose of the vehicle down enough to get the main horizontal stabilizer of the T-tail (1506a) out of the wake (1504) of the stalled main wing, thereby restoring pitch control.

For clarity, the following figure shows the same example but without the vorticities shown here.

Figure 15B:
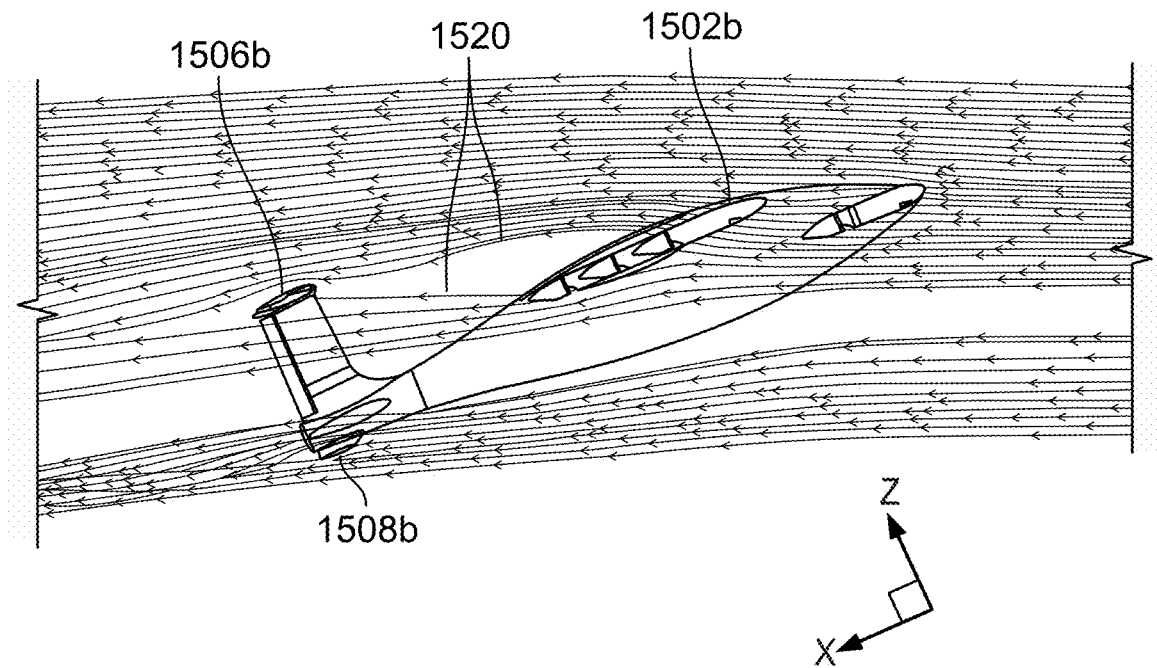
FIG. 15B is a diagram illustrating an embodiment of the streamlines of a tilt rotor vehicle with a T-tail in a deep stall.

FIG. 15B is a diagram illustrating an embodiment of the streamlines of a tilt rotor vehicle with a T-tail in a deep stall. In this example, the streamlines (1520) which pass by the main wing (obscured by pylons 1502b) and then interfere with the horizontal stabilizer of the T-tail (1506b) and cause the deep stall can be better seen. As described above, the dovetails (1508b) will push the nose of the vehicle down, permitting the horizontal stabilizer of the T-tail (1506b) to rise above the interference from the main wing, thus restoring pitch control.

In some embodiments, a tilt rotor vehicle (various examples of which are described above) is designed to have a desired stall sequence. The following figure describes an example of this.

Figure 16:
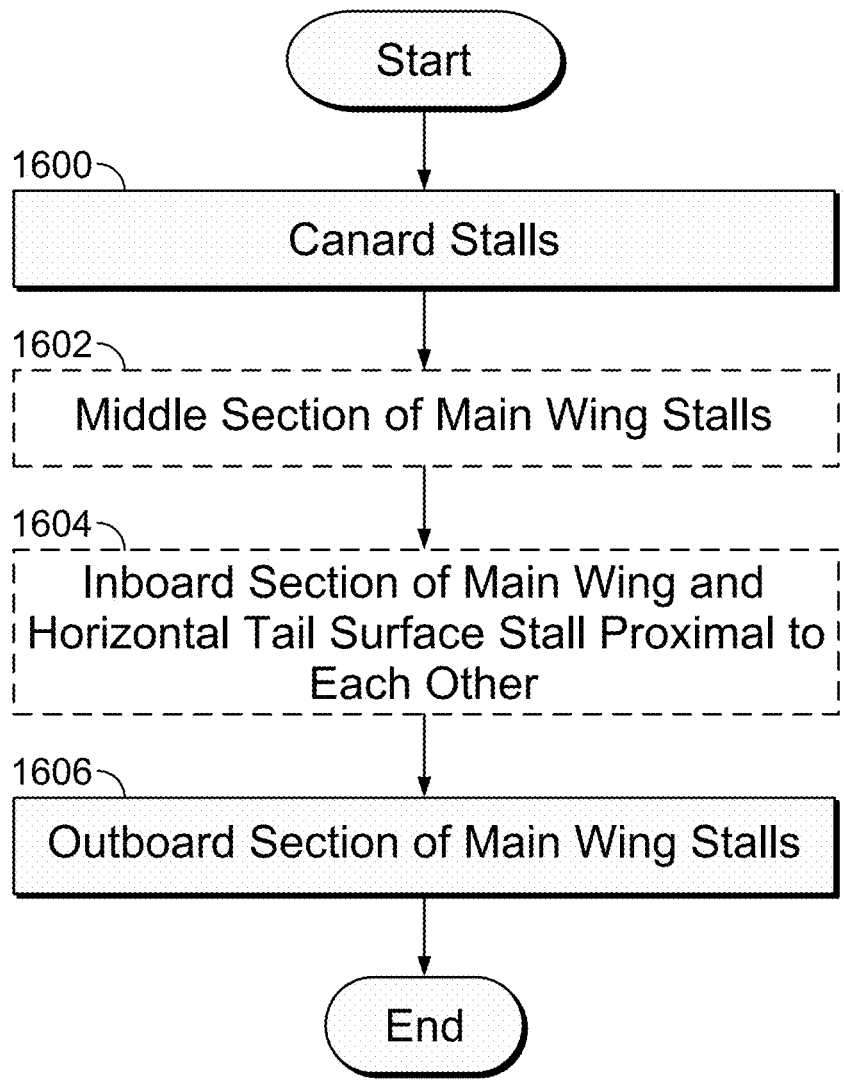
FIG. 16 is a flowchart illustrating an embodiment of a stall sequence.

FIG. 16 is a flowchart illustrating an embodiment of a stall sequence. In this example, a sequence or order in which various (e.g., horizontal aerodynamic lift) surfaces stall (e.g., as the nose of the aircraft lifts up) is described where this sequence is preferable to some other stall sequences for the reasons described below. An aircraft may progress through the described stall sequence as the nose of the vehicle lifts up more and more. In some embodiments, the main wing is designed to achieve the stall sequence described herein (e.g., by appropriately selecting the wing twist or other shape or dimension of the main wing). It is noted that although FIG. 12C is used as an example to show exemplary surfaces that stall in the described order, the stall sequence described herein is applicable to and/or desirable for other embodiments, such as the embodiment shown in FIGS. 8A-8C.

At 1600, the canard stalls. For example, in FIG. 12C, the nose of the vehicle shown may lift up sufficiently so that canard 1204c stalls. By having the canard stall first, this provides a pitch down (i.e., the nose drops down) moment, which is a restoring moment that counters the nose lifting up (which caused the canard to stall in the first place). For this reason (i.e., the restoring moment and/or movement), having the canard stall first is desirable.

At 1602, the middle section of the main wing stalls. For example, in FIG. 12C, the main wing (1210c) may have a wing twist so that the inner (inboard) section 1222, the middle section (1224), and the outer (outboard) section 1226 each stall at different times and/or angles of attack. As an example of step 1602, middle section 1224 in FIG. 12C stalls (e.g., after canard 1204c).

At 1604, the inboard section of the main wing and the horizontal tail surface stall proximal to each other. For example, in FIG. 12C, inner section 1222 and T-tail 1200c stalls at roughly the same time (but after canard 1204c stalls first and middle section 1224 stalls second). It is noted that the inboard section of the main wing and the horizontal tail surface don't have to stall at exactly at the same time (i.e., simultaneously), just close to each other. The exact order can be either one first.

At 1606, the outboard section of the main wing stalls. For example, in FIG. 12C, outboard section 1226 stalls (e.g., after canard 1204c (first), middle section 1224 (second), and inner section 1222 and T-tail 1200c (third)).

In one example, suppose a vehicle is executing a pitch up maneuver of 5 degrees per second. A minimum acceptable time difference between the canard stall (at 1600) and the outboard section stalling (at 1606), at least in this example, would be on the order of a 0.5-1 second difference. This difference would keep the aircraft controllable and/or give the pilot enough time to respond to the various stalls.

The exemplary vehicle shown in FIG. 12C has three main lifting surfaces: the canard (1204c) in the front, the main wing (1210c) in the middle, and the T-tail (1200c) in the back. In this example, the sequence in which those surfaces stall (e.g., as the vehicle pitches (nose) up) is designed to follow the desired sequence shown here. One benefit to following this sequence is that it aids feedback to the pilot (e.g., that the pilot should lower the nose of the aircraft) and/or results in a balance of forces that causes the nose lower passively (e.g., without pilot intervention).

As described above, since this vehicle is a tilt rotor vehicle, for good distribution of the tilting motors and propellers in hover mode (i.e., so that the center of thrust is close to the center of mass (1220 in FIG. 12C) for the vehicle in the horizontal plane), the main wing is forward swept. As a result of the main wing's forward sweep, the sequence in which the inboard section (1222 in FIG. 12C), middle section (1224 in FIG. 12C), and outboard section (1226 in FIG. 12C) of the main wing stall becomes important. This is because unlike a typical general aviation aircraft where the wing is straight (and thus the section-wise stall sequence of the wing primarily affects roll control considerations), in a forward swept wing, the stall sequence not only has consequences for roll control, but also for pitch control.

A typical general aviation aircraft (unlike the various tilt rotor vehicles described herein) only has two of the three lift surfaces described above: namely, a main wing and a tail with some horizontal surface at the back. For moment arm considerations, such a general aviation aircraft usually includes control surfaces called ailerons (e.g., on the outboard sections of the main wing) to allow roll control. When the main wing is designed, the outboard sections containing the ailerons are typically twisted leading edge down compared to the rest of the wing. This means that as the whole wing pitches up, the relative angle with respect to the oncoming wind on the tips is lower than on the rest of the wing. As the wing approaches its stall angle of attack, the inner sections of the wing start to stall, but the outer sections, being at a lower local angle of attack, do not. This allows the ailerons to still allow roll control through the stall.

In contrast, with the various tilt rotor vehicles described herein, it would be desirable if the outer (outboard) section of the main wing (e.g., 1226 in FIG. 12C) stalls last so that the vehicle can maintain roll control as long as possible. However, the innermost wing sections (e.g., 1222 in FIG. 12C) cannot be allowed to stall too early either, since their centers of lift (e.g., 1230 in FIG. 12C) are aft of the vehicle's center of gravity (e.g., 1220 in FIG. 12C). If these inboard sections (e.g., 1222 in FIG. 12C) were to stall, a nose-up pitch moment would be experienced by the aircraft, further speeding up the stall sequence. Thus, the main wing twist is designed such that the middle sections, which have centers of lift (e.g., 1232 in FIG. 12C) that are abeam of the vehicle's center of gravity (e.g., 1220 in FIG. 12C), stall first. This provides feedback to the pilot in the form of buffeting. The nose also has a tendency to dip passively as the available lift declines. The inboard sections (e.g., 1222 in FIG. 12C) stall next and the outboard sections (e.g., 1226 in FIG. 12C) stall last, allowing the aircraft to retain roll control until the last possible moment (e.g., because the centers of lift (e.g., 1234 in FIG. 12C) for the outboard sections is fore of the vehicle's center of gravity (e.g., 1220 in FIG. 12C) so a stall here results in loss of roll control). This stall sequence permits the aircraft to maintain roll and pitch control for as long as possible, permitting the vehicle to escape from any spin or spiral modes that might develop in conjunction with the stall until the last possible moment.

The following table describes an example of angle ranges for the various sections of the main wing that achieve the stall sequence described in FIG. 16.

TABLE 2

Example of twist angle ranges to achieve the stall sequence described in FIG. 16.

| Main Wing Section | Twist Angle Range |
|---|---|
| Inboard Section (e.g., 1222 in FIG. 12C) | −5° to 0° |

TABLE 2-continued

Example of twist angle ranges to achieve
the stall sequence described in FIG. 16.

| Main Wing Section | Twist Angle Range |
|---|---|
| Middle Section (e.g., 1224 in FIG. 12C) | 0° to 5° |
| Outboard Section (e.g., 1226 in FIG. 12C) | −5° to 0° |

For completeness, the example stall sequence described herein includes all horizontal lift surfaces of the vehicle. It is noted, however, that the middle of the stall sequence may be changed in some applications with little or no impact to the vehicle. For the reasons described above, it is desirable to have the canard stall first (see step 1600) and the outer section of the main wing stall last (see step 1606) but the middle of the stall sequence (e.g., steps 1602 and 1604) has some flexibility. For example, depending on the authority available from the tail, the relative stall sequence of the middle and inner wing sections may or may not be critical. For this reason, steps 1602 and 1604 have a dashed border instead of a solid border in FIG. 16.

In some embodiments, the various example vehicles described herein (e.g., including FIGS. 8A-8C and FIGS. 12A-12D) have a different lift distribution in cruise (i.e., forward flight) compared to other types of vehicles. More specifically, the lift forces on the canard and tail are both substantially lower than that on the main wing during cruise compared to other vehicles that have canards. See, for example, the table below (which for completeness includes various phase of flight beyond cruise and fast cruise). It is noted that the horizontal tail referred to in the rightmost column includes a variety of tail configurations (e.g., including those tails shown in FIGS. 8A-8C and FIGS. 12A-12D).

TABLE 3

Example relative lifting forces on the three main
lifting surfaces during various phases of flight.

| Flight Phase/Mode | Lifting Force-Canard | Lifting Force-Main Wing | Lifting Force-Horizontal Tail |
|---|---|---|---|
| Takeoff/hover (e.g., from rotor thrust, not aerodynamic lift) | 25% | 75% | 0% |
| Transition (e.g., between takeoff/hover and cruise) | 25%-35% | 75%-80% | −10%-10% |
| Slower cruise (e.g., ~85 kts) | 8% | 87% | 5% |
| Faster cruise (e.g., 120 kts-150 kts) | 5% | 95% | 0% |

Typically, a canard aircraft carries more lift on the canard during cruise (e.g., 25%-30%) but that is not the case for the vehicles described herein. See, for example, the slower cruise row and faster cruise row where the lifting force associated with the canard is 8% and 5% respectively. Generally speaking, the canards in the embodiments described herein have an associated lifting force within 0% and 15% during cruise (i.e., forward flight). Instead, most of the lifting during cruise is done by the main wing (e.g., 80% to 100%) which adds to vehicle efficiency. It is further noted that during slower cruise and faster cruise, all of the surfaces are associated with lifting forces and none of the surfaces are associated with downward forces (e.g., all of the lifting percentages are positive values). This is an indication that the vehicles can fly efficiently because the surfaces that have lift do not have to make up or otherwise compensate for another surface which has a downward force.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An aircraft, comprising:
   a canard having a leading edge and a trailing edge;
   a forward swept and fixed wing having a trailing edge;
   a plurality of tilt rotor submodules that are coupled to the trailing edge of the forward swept and fixed wing; and
   a dovetail attached to an underside of a fuselage; and
   a T-tail located above the dovetail, wherein a horizontal plane of the T-tail is at a height that is higher than a horizontal plane of the forward swept and fixed wing;
   wherein the fuselage rests on the dovetail when the aircraft is on the ground.

2. The aircraft of claim 1, wherein the horizontal plane of the forward swept and fixed wing is at a height that is higher than a horizontal plane of the canard.

3. The aircraft of claim 1, wherein the plurality of tilt rotor submodules includes two tilt rotor submodules that are coupled to the canard and six tilt rotor submodules that are coupled to the forward swept and fixed wing.

4. The aircraft of claim 1, wherein the forward swept and fixed wing has a relative lifting force within a range of 80% to 100%, inclusive, during a cruise mode.

5. The aircraft of claim 1, wherein an inboard section of the forward swept and fixed wing has a twist angle within a range of −5° to 0°, inclusive.

6. The aircraft of claim 1, wherein a middle section of the forward swept and fixed wing has a twist angle within a range of 0° to 5°, inclusive.

7. The aircraft of claim 1, wherein an outboard section of the forward swept and fixed wing has a twist angle within a range of −5° to 0°, inclusive.

8. The aircraft of claim 1, wherein an outboard section of the forward swept and fixed wing stalls after the canard.

9. The aircraft of claim 1, wherein an outboard section of the forward swept and fixed wing stalls after the rest of the forward swept and fixed wing.

10. The aircraft of claim 1, wherein the T-tail is located at the height of 0.7 to 1.2 meters above a base of the aircraft.

11. A method, comprising:
    providing a canard having a leading edge and a trailing edge;
    providing a forward swept and fixed wing having a trailing edge;
    providing a plurality of tilt rotor submodules that are coupled to the trailing edge of the forward swept and fixed wing; and
    providing a dovetail attached to an underside of a fuselage; and
    providing a T-tail located above the dovetail, wherein a horizontal plane of the T-tail is at a height that is higher than a horizonal plane of the forward swept and fixed wing;
    wherein the fuselage rests on the dovetail when the aircraft is on the ground.

12. The method of claim 11, wherein a horizontal plane of the forward swept and fixed wing is at a height that is higher than a horizontal plane of the canard.

13. The method of claim 11, wherein the plurality of tilt rotor submodules includes two tilt rotor submodules that are coupled to the canard and six tilt rotor submodules that are coupled to the forward swept and fixed wing.

14. The method of claim 11, wherein the forward swept and fixed wing has a relative lifting force within a range of 80% to 100%, inclusive, during a cruise mode.

15. The method of claim 11, wherein an inboard section of the forward swept and fixed wing has a twist angle within a range of −5° to 0°, inclusive.

16. The method of claim 11, wherein a middle section of the forward swept and fixed wing has a twist angle within a range of 0° to 5°, inclusive.

17. The method of claim 11, wherein an outboard section of the forward swept and fixed wing has a twist angle within a range of −5° to 0°, inclusive.

18. The method of claim 11, wherein an outboard section of the forward swept and fixed wing stalls after the canard.

19. The method of claim 11, wherein an outboard section of the forward swept and fixed wing stalls after the rest of the forward swept and fixed wing.

20. The method of claim 11, wherein the T-tail is located at the height of 0.7 to 1.2 meters above a base of the aircraft.

\* \* \* \* \*